(12) United States Patent
Nakagawa

(10) Patent No.: US 12,112,634 B2  
(45) Date of Patent: Oct. 8, 2024

(54) IN-VEHICLE DEVICE, PASSING-THROUGH DETERMINATION METHOD, AND RECORDING MEDIUM

(71) Applicant: NEC Corporation, Tokyo (JP)

(72) Inventor: Yoshinao Nakagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 121 days.

(21) Appl. No.: 17/800,250

(22) PCT Filed: Jul. 6, 2020

(86) PCT No.: PCT/JP2020/026369
§ 371 (c)(1),
(2) Date: Aug. 17, 2022

(87) PCT Pub. No.: WO2021/171643
PCT Pub. Date: Sep. 2, 2021

(65) Prior Publication Data
US 2023/0103719 A1 Apr. 6, 2023

(30) Foreign Application Priority Data
Feb. 28, 2020 (WO) .................. PCT/JP2020/008304

(51) Int. Cl.
G08G 1/16 (2006.01)
G08G 1/01 (2006.01)
G08G 1/04 (2006.01)

(52) U.S. Cl.
CPC .............. *G08G 1/16* (2013.01); *G08G 1/0129* (2013.01); *G08G 1/0133* (2013.01); *G08G 1/04* (2013.01)

(58) Field of Classification Search
CPC ...... G08G 1/16; G08G 1/0129; G08G 1/0133; G08G 1/04; G08G 1/00; B60W 40/02;
(Continued)

(56) References Cited

U.S. PATENT DOCUMENTS

2002/0183906 A1 12/2002 Ikeda

FOREIGN PATENT DOCUMENTS

JP 2002-352397 A 12/2002
JP 2004114907 A * 4/2004
(Continued)

OTHER PUBLICATIONS

International Search Report for PCT Application No. PCT/JP2020/026389, mailed on Sep. 24, 2020.
(Continued)

*Primary Examiner* — James J Yang
*Assistant Examiner* — Anthony D Afrifa-Kyei
(74) *Attorney, Agent, or Firm* — Sughrue Mion, PLLC

(57) ABSTRACT

An on-vehicle device according to the present disclosure includes: a driver identification means for identifying a driver; a road-to-be-traveled width measurement means for measuring a road-to-be-traveled width being the width of a road-to-be-traveled; a passable road width acquisition means for acquiring a passable road width being a road width passable by an own vehicle driven by a driver identified by the driver identification means; a first determination means for determining whether the road-to-be-traveled width is narrower than the passable road width; and a notification means for, when the road-to-be-traveled width is determined to be narrower than the passable road width by the first determination means, giving notification that a narrow road being a road-to-be-traveled the road-to-be-traveled width of which is determined to be narrower than the passable road width by the first determination means is impassable by an own vehicle driven by a driver identified by the driver identification means.

17 Claims, 13 Drawing Sheets

(58) Field of Classification Search
CPC ...... B60W 40/00; B60W 40/04; B60W 40/06; B60W 30/02; B60W 30/0956; B60W 30/00; B60W 30/08; B60W 30/095; B60W 30/18163; B60G 2400/821; B60G 2400/00; B60G 2400/80; B60G 2400/82; B60G 2400/824; B60G 2401/16; B60G 2600/0422; B60G 2600/70; B60G 2800/16; B60G 17/0165; G01C 21/32
See application file for complete search history.

(56) References Cited

FOREIGN PATENT DOCUMENTS

| JP | 2005326963 A | * | 11/2005 |
|---|---|---|---|
| JP | 2007-133873 A | | 5/2007 |
| JP | 2012-133614 A | | 7/2012 |
| JP | 2013-043563 A | | 3/2013 |
| JP | 2019-087127 A | | 6/2019 |

OTHER PUBLICATIONS

JP Office Action for JP Application No. 2022-503067, mailed on Jun. 6, 2023 with English Translation.

* cited by examiner

IN-VEHICLE DEVICE, PASSING-THROUGH DETERMINATION METHOD, AND RECORDING MEDIUM

This application is a National Stage Entry of PCT/JP2020/026369 filed on Jul. 6, 2020, which claims priority from International Patent Application PCT/JP2020/008304 filed on Feb. 28, 2020, the contents of all of which are incorporated herein by reference, in their entirety.

TECHNICAL FIELD

The present disclosure relates to an on-vehicle device, a passing-through determination method, and a storage medium.

BACKGROUND ART

A device capturing an image of a traveling direction of an own vehicle, measuring (detecting) the road width of a road-to-be-traveled in the traveling direction of the own vehicle, based on the captured image, determining whether the road-to-be-traveled is passable by the own vehicle by comparing the measured road width with a passable width (a value acquired by adding the vehicle width of the own vehicle and a passing clearance), and when the road-to-be-traveled is determined to be impassable, giving notification (warning) to that effect is described in, for example, Patent Literature 1.

CITATION LIST

Patent Literature

Patent Literature 1: Japanese Unexamined Patent Application Publication No. 2004-114907

SUMMARY OF INVENTION

Technical Problem

However, the device described in Patent Literature 1 does not at all propose determining, for each driver, whether a road-to-be-traveled is passable by an own vehicle driven by the driver and giving notification of the determination result.

In view of the aforementioned problem, an object of the present disclosure is to provide an on-vehicle device, a passing-through determination method, and a storage medium that enable determination of, for each driver, whether a road-to-be-traveled is passable by an own vehicle driven by the driver and notification of determination result.

Solution to Problem

An on-vehicle device according to a first aspect of the present disclosure includes: a driver identification means for identifying a driver; a road-to-be-traveled width measurement means for measuring a road-to-be-traveled width being a road width of a road-to-be-traveled; a passable road width acquisition means for acquiring a passable road width being a road width passable by an own vehicle driven by a driver identified by the driver identification means; a first determination means for determining whether the road-to-be-traveled width is narrower than the passable road width; and a notification means for, when the road-to-be-traveled width is determined to be narrower than the passable road width by the first determination means, giving notification that a narrow road being a road-to-be-traveled the road-to-be-traveled width of which is determined to be narrower than the passable road width by the first determination means is impassable by an own vehicle driven by a driver identified by the driver identification means.

An on-vehicle device according to a second aspect of the present disclosure includes: a driver identification means for identifying a driver; a road-to-be-traveled height measurement means for measuring a road-to-be-traveled height being a height from a road surface of a road-to-be-traveled to an object over the road surface; a passable road height acquisition means for acquiring a passable road height being a height from a road surface of a road passable by an own vehicle driven by a driver identified by the driver identification means to an object over the road surface; a fifth determination means for determining whether the road-to-be-traveled height is lower than the passable road height; and a notification means for, when the road-to-be-traveled height is determined to be lower than the passable road height by the fifth determination means, giving notification that a narrow road being a road-to-be-traveled the road-to-be-traveled height of which is determined to be lower than the passable road height by the fifth determination means is impassable by an own vehicle driven by a driver identified by the driver identification means.

A passing-through determination method according to a third aspect of the present disclosure includes: a driver identification step of identifying a driver; a road-to-be-traveled width measurement step of measuring a road-to-be-traveled width being a road width of a road-to-be-traveled; a passable road width acquisition step of acquiring a passable road width being a road width passable by an own vehicle driven by a driver identified by the driver identification means; a first determination step of determining whether the road-to-be-traveled width is narrower than the passable road width; and a notification step of, when the road-to-be-traveled width is determined to be narrower than the passable road width by the first determination step, giving notification that a narrow road being a road-to-be-traveled the road-to-be-traveled width of which is determined to be narrower than the passable road width by the first determination step is impassable by an own vehicle driven by a driver identified by the driver identification means.

A passing-through determination method according to a fourth aspect of the present disclosure includes: a driver identification step of identifying a driver; a road-to-be-traveled height measurement step of measuring a road-to-be-traveled height being a height from a road surface of a road-to-be-traveled to an object over the road surface; a passable road height acquisition step of acquiring a passable road height being a height from a road surface of a road passable by an own vehicle driven by a driver identified by the driver identification means to an object over the road surface; a fifth determination step of determining whether the road-to-be-traveled height is lower than the passable road height; and a notification step of, when the road-to-be-traveled height is determined to be lower than the passable road height by the fifth determination step, giving notification that a narrow road being a road-to-be-traveled the road-to-be-traveled height of which is determined to be lower than the passable road height by the fifth determination step is impassable by an own vehicle driven by a driver identified by the driver identification means.

A storage medium according to a fifth aspect of the present disclosure is a computer readable storage medium having a program recorded thereon, the program causing an electronic device including at least one processor to execute: driver identification processing of identifying a driver; road-to-be-traveled width measurement processing of measuring a road-to-be-traveled width being a road width of a road-to-be-traveled; passable road width acquisition processing of acquiring a passable road width being a road width passable by an own vehicle driven by a driver identified by the driver identification means; first determination processing of determining whether the road-to-be-traveled width is narrower than the passable road width; and notification processing of, when the road-to-be-traveled width is determined to be narrower than the passable road width by the first determination processing, giving notification that a narrow road being a road-to-be-traveled the road-to-be-traveled width of which is determined to be narrower than the passable road width by the first determination processing is impassable by an own vehicle driven by a driver identified by the driver identification means.

A storage medium according to a sixth aspect of the present disclosure is a computer readable storage medium having a program recorded thereon, the program causing an electronic device including at least one processor to execute: driver identification processing of identifying a driver; road-to-be-traveled height measurement processing of measuring a road-to-be-traveled height being a height from a road surface of a road-to-be-traveled to an object over the road surface; passable road height acquisition processing of acquiring a passable road height being a height from a road surface of a road passable by an own vehicle driven by a driver identified by the driver identification means to an object over the road surface; fifth determination processing of determining whether the road-to-be-traveled height is lower than the passable road height; and notification processing of, when the road-to-be-traveled height is determined to be lower than the passable road height by the fifth determination processing, giving notification that a narrow road being a road-to-be-traveled the road-to-be-traveled height of which is determined to be lower than the passable road height by the fifth determination processing is impassable by an own vehicle driven by a driver identified by the driver identification means.

Advantageous Effects of Invention

The present invention can provide an on-vehicle device, a passing-through determination method, and a storage medium that enable determination of, for each driver, whether a road-to-be-traveled is passable by an own vehicle driven by the driver and notification of the determination result.

EXAMPLE EMBODIMENT

First Example Embodiment

An on-vehicle device 1A being a first example embodiment of the present invention will be described below with reference to attached drawings. Corresponding components in the diagrams are given the same signs, and redundant description thereof is omitted.

First, a configuration of the on-vehicle device 1A will be described by using FIG. 1.

Figure 1:
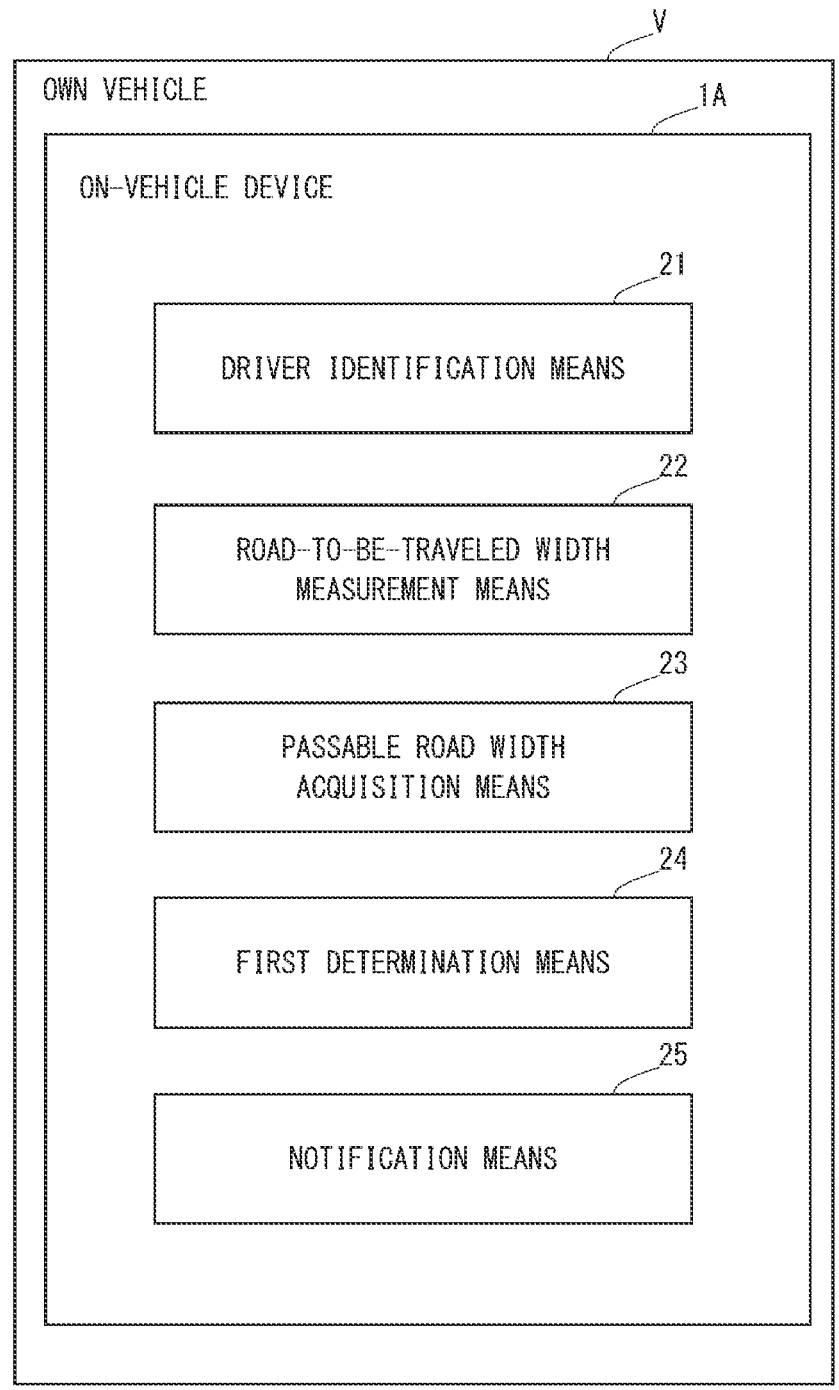
FIG. 1 is a schematic configuration diagram of an on-vehicle device 1A.

FIG. 1 is a schematic configuration diagram of the on-vehicle device 1A. It is hereinafter assumed that the on-vehicle device 1A is equipped on an own vehicle V.

As illustrated in FIG. 1, the on-vehicle device 1A includes a driver identification means 21 for identifying a driver, a road-to-be-traveled width measurement means 22 for measuring a road-to-be-traveled width WA being the width of a road-to-be-traveled, a passable road width acquisition means 23 for acquiring a passable road width WB being the width of a road passable by the own vehicle V driven by a driver identified by the driver identification means 21, a first determination means 24 for determining whether the road-to-be-traveled width WA is narrower than the passable road width WB, and a notification means 25 for, when the road-to-be-traveled width WA is determined to be narrower than the passable road width WB by the first determination means 24, giving notification that a narrow road being the road-to-be-traveled the road-to-be-traveled width WA of which is determined to be narrower than the passable road width WB by the first determination means 21 is impassable by the own vehicle V driven by the driver identified by the driver identification means 21.

The first example embodiment enables, for each driver, determination of whether a road-to-be-traveled is passable by the own vehicle V driven by the driver and notification of the determination result. Thus, the driver can previously recognize that the road-to-be-traveled (narrow road) is impassable by the own vehicle V.

Second Example Embodiment

The on-vehicle device 1A according to the first example embodiment will be described in more detail below as a second example embodiment of the present invention.

Figure 2:
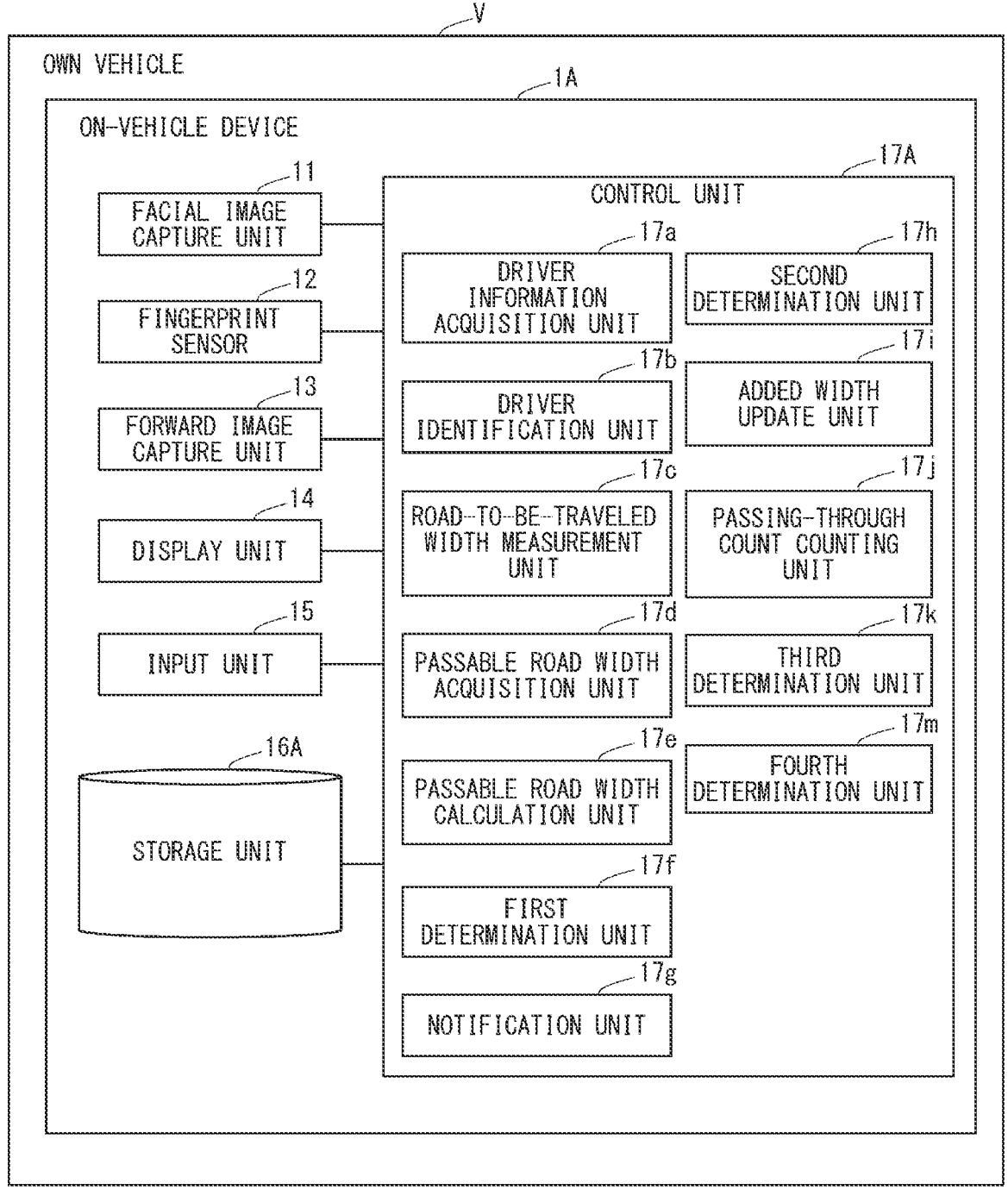
FIG. 2 is a detailed configuration diagram of the on-vehicle device 1A.

FIG. 2 is a detailed configuration diagram of the on-vehicle device 1A. It is hereinafter assumed that the on-vehicle device 1A is equipped on the own vehicle V.

As illustrated in FIG. 2, the on-vehicle device 1A mainly includes a facial image capture unit 11, a fingerprint sensor 12, a forward image capture unit 13, a display unit 14, an input unit 15, a storage unit 16A, and a control unit 17A as a hardware configuration.

The facial image capture unit 11 is an image capture device (camera) configured to capture a facial image including the face of a driver driving the own vehicle V.

The fingerprint sensor 12 is a sensor configured to read a fingerprint of the driver driving the own vehicle V.

The forward image capture unit 13 is an image capture device (camera) configured to capture an image of an area ahead of the own vehicle. For example, the forward image capture unit 13 is placed at a predetermined spot in a cabin of the own vehicle V and captures an image including a road-to-be-traveled ahead of the own vehicle through a windshield of the own vehicle V. A road-to-be-traveled refers to a road existing in a traveling direction of the own vehicle V (such as a road existing ten-odd meters to several tens of meters ahead).

For example, the display unit 14 is a liquid crystal display and is placed at a predetermined spot in the cabin of the own vehicle V in such a way as to be visually recognized by the driver easily.

For example, the input unit 15 is a touch panel and is placed in a state of covering a display surface of the display unit 14.

For example, the storage unit 16A is a hard disk device.

Figure 3:
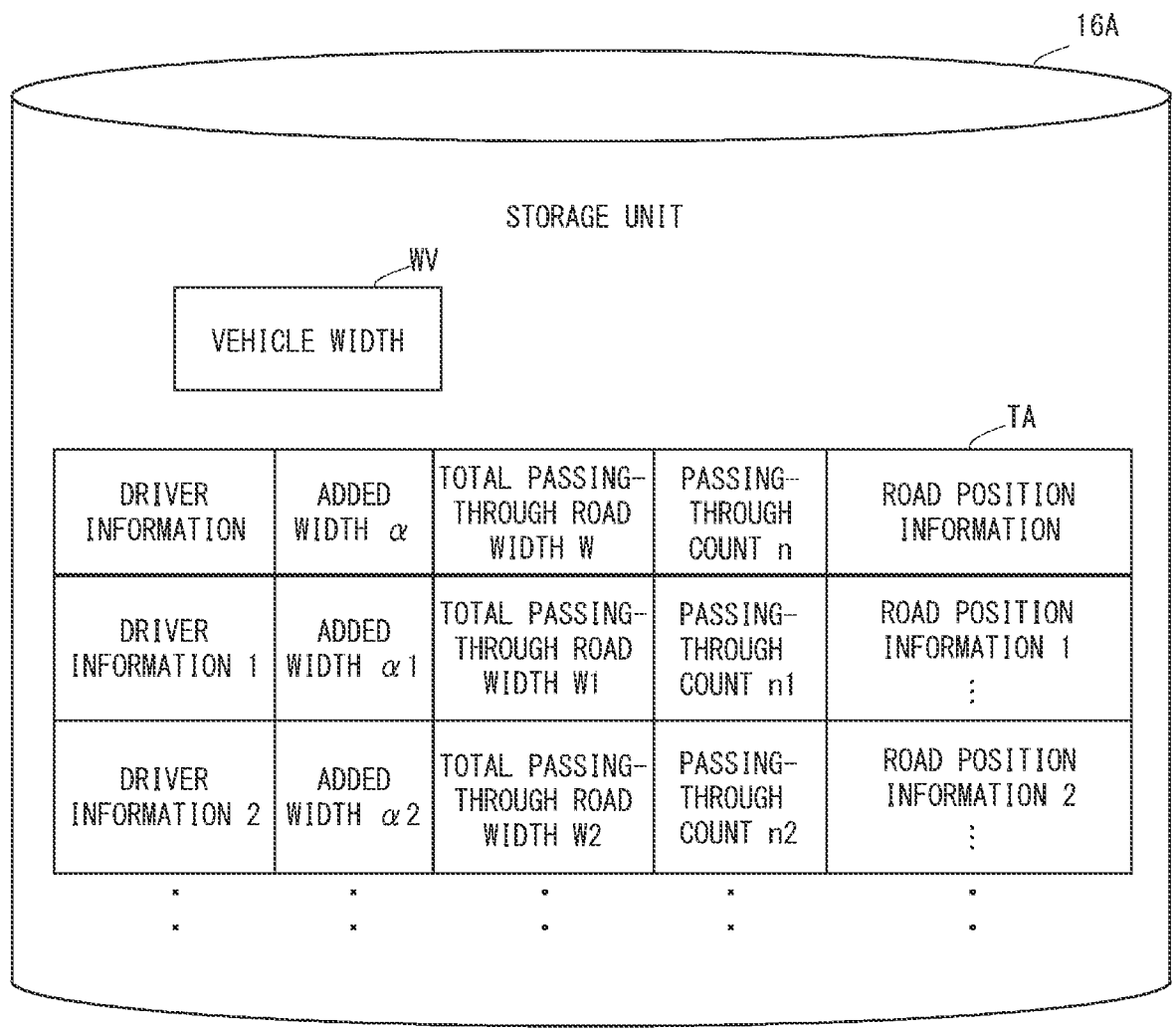
FIG. 3 is an example of various types of data stored in a storage unit 16A.
Figure 4:
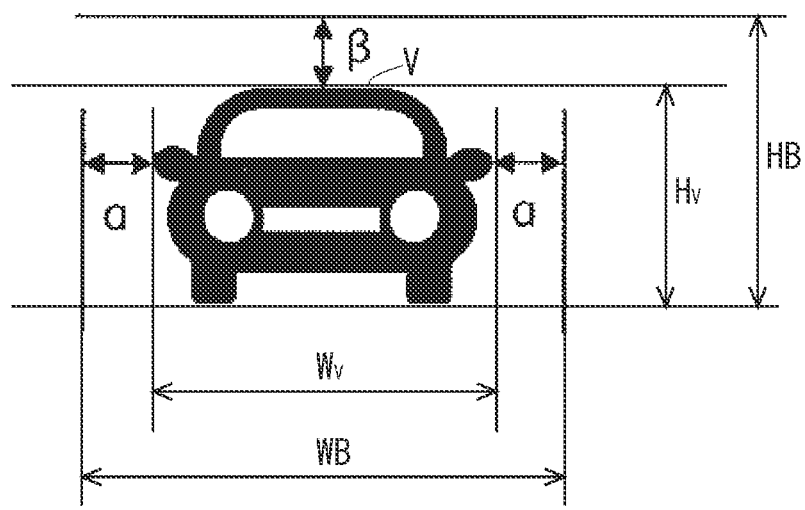
FIG. 4 is an example of a vehicle width and the like of an own vehicle V.

FIG. 3 is an example of various types of data stored in the storage unit 16A. FIG. 4 is an example of a vehicle width and the like of the own vehicle V.

As illustrated in FIG. 3, the storage unit 16A configured to store a vehicle width $W_V$, and a driver information table TA. The storage unit 16A is an example of a vehicle width storage means, an added width storage means, and a road position information storage means according to the present invention.

As illustrated in FIG. 4, the vehicle width $W_V$ represents the vehicle width of the own vehicle V. It is assumed in the second example embodiment that the vehicle width $W_V$ is previously stored in the storage unit 16A.

As illustrated in FIG. 3, the driver information table TA includes "driver information," "added width α," "total passing-through road width W," "passing-through count n," and "road position information" as items.

Driver information for identifying a driver is stored in "driver information." Examples of the driver information include data representing a feature point extracted from a facial image of a driver captured by the facial image capture unit 11, data representing a feature point extracted from a fingerprint of the driver read by the fingerprint sensor 12, and data representing attributes (such as the name, the age, and the gender) of the driver input from the input unit 15. It is assumed in the second example embodiment that driver information of two drivers (driver information 1 and driver information 2) is previously stored in "driver information" as illustrated in FIG. 3. Note that the driver information may include information for one driver or for three drivers or more.

An added width (margin) to be added to the vehicle width $W_V$ of the own vehicle V is stored in "added width α." For example, a driver inputs (sets) a value based on the driving proficiency and the driving level of the driver to "added width α" through the input unit 15. For example, "added width α" includes any numerical value between 5 and 100 cm. The input added width is stored in "added width α" for the relevant driver. The input unit 15 is an example of an added width setting means according to the present invention. It is assumed in the second example embodiment that added widths of two drivers (an added width α1 and an added width α2) are previously stored in "added width α" as illustrated in FIG. 3.

The road width of a narrow road determined, by a second determination unit 17h to be described later, to be passed through by the own vehicle V is added and stored in "total passing-through road width W". A narrow road refers to a road-to-be-traveled the road-to-be-traveled width WA (see FIG. 8) of which is determined to be narrower than the passable road width WB (see FIG. 4) by a first determination unit 17f to be described later. Note that "0" is stored in "total passing-through road width W" as an initial value.

The number of times a narrow road has been passed through by the own vehicle V driven by a driver identified by the driver identification unit 17b is stored in "passing-through count n." Note that "0" is stored in "passing-through count n" as an initial value.

Road position information indicating the position of a narrow road having been passable in the past by the own vehicle V driven by a driver identified by the driver identification unit 17b is stored in "road position information."

For example, the control unit 17A is an electronic control unit (ECU). While not being illustrated, the control unit 17A includes a processor. For example, the processor is a CPU. One processor may be included, or a plurality of processors may be included. By executing a predetermined program read from a nonvolatile memory such as a ROM (unillustrated) into a RAM (unillustrated), the processor functions as a driver information acquisition unit 17a, the driver identification unit 17b, a road-to-be-traveled width measurement unit 17c, a passable road width acquisition unit 17d, a passable road width calculation unit 17e, the first determination unit 17f, a notification unit 17g, the second determination unit 17h, an added width update unit 17i, a passing-through count counting unit 17j, a third determination unit 17k, and a fourth determination unit 17m, as illustrated in FIG. 2. The units may be provided by hardware in part or in whole. The driver identification unit 17b is an example of the driver identification means 21, the road-to-be-traveled width measurement unit 17c is an example of the road-to-be-traveled width measurement means 22, the passable road width acquisition unit 17d is an example of the passable road width acquisition means 23, the first determination unit 17f is an example of the first determination means 24, and the notification unit 17g is an example of the notification means 25.

The driver information acquisition unit 17a configured to acquire driver information of a driver of the own vehicle V such as data representing a feature point extracted from a facial image of the driver captured by the facial image capture unit 11, data representing a feature point extracted from a fingerprint of the driver read by the fingerprint sensor 12, and data representing attributes (such as the name, the age, and the gender) of the driver input from the input unit 15.

The driver identification unit 17b configured to identify a driver of the own vehicle V. For example, the driver identification unit 17b identifies a driver of the own vehicle V by comparing (checking) driver information acquired by the driver information acquisition unit 17a with (against) "driver information" in the driver information table TA.

The road-to-be-traveled width measurement unit 17c configured to measure a road-to-be-traveled width WA (see FIG. 8) being the road width of a road-to-be-traveled. For example, the road-to-be-traveled width measurement unit 17c measures a road-to-be-traveled width WA being the road width of a road-to-be-traveled, based on an image captured by the forward image capture unit 13.

For example, a technology called simultaneous localization and mapping (SLAM) may be used for measurement of a road-to-be-traveled width WA. When SLAM is used, the road-to-be-traveled width measurement unit 17c analyzes an image captured by the forward image capture unit 13, extracts a feature point, calculates the distance to the extracted feature point, determines coordinates of the feature point, and calculates a road-to-be-traveled width WA, based on the determined feature point. The distance to each feature point can be found by a trigonometric parallax survey. Movement of the own vehicle V forms a triangle including three points being a point before the movement, a point after the movement, and a feature point. The distance to the feature point can be calculated based on the length (moved distance) of one side of the triangle and the two adjacent angles.

Figure 5:
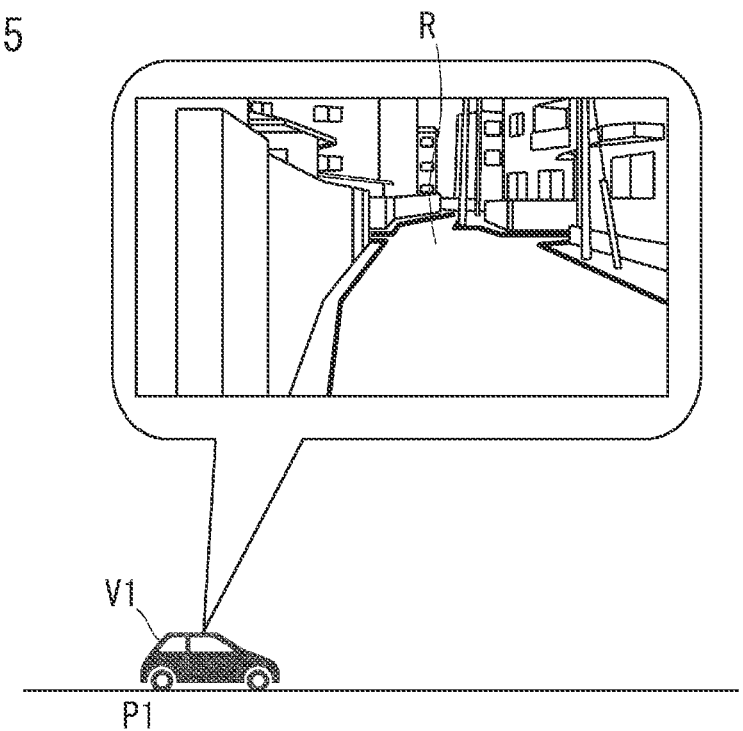
FIG. 5 is an example of a forward image captured by the own vehicle V (forward image capture unit 13) at a position P1.
Figure 6:
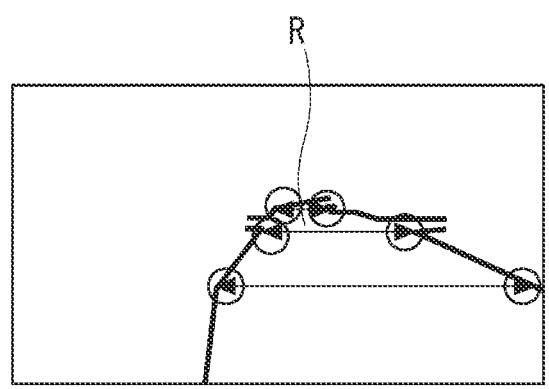
FIG. 6 is an example of feature points extracted from the image illustrated in FIG. 5.

FIG. 5 is an example of an image of an area ahead of the own vehicle captured by the own vehicle V (forward image capture unit 13) at a position P1. The image includes a road-to-be-traveled R. FIG. 6 is an example of feature points extracted from the image illustrated in FIG. 5. Each circle in FIG. 6 represents a feature point.

Figure 7:
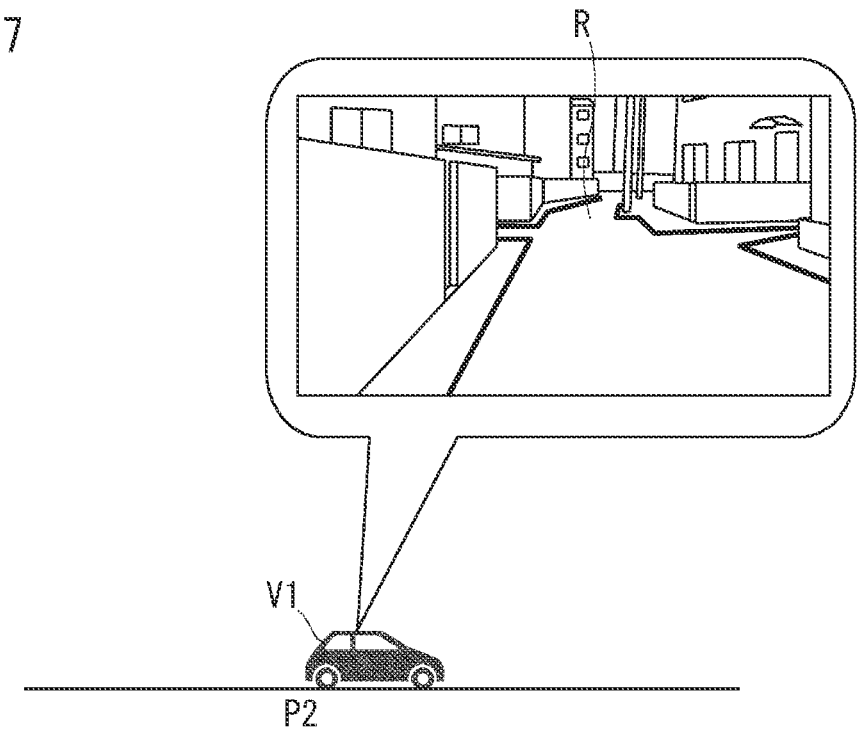
FIG. 7 is an example of a forward image captured by the own vehicle V (forward image capture unit 13) at a position P2 forward of the position P1 illustrated in FIG. 5.
Figure 8:
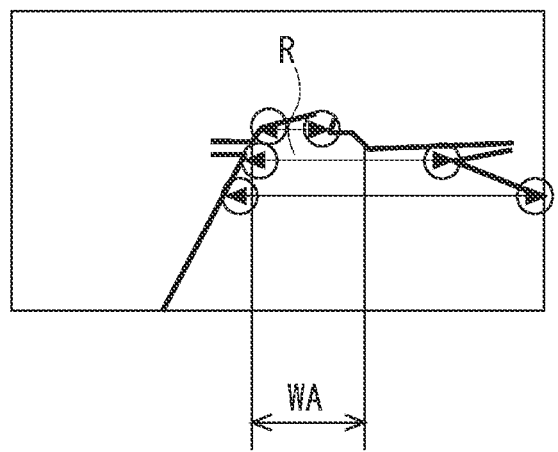
FIG. 8 is an example of feature points extracted from the image illustrated in FIG. 7.

FIG. 7 is an example of an image of an area ahead of the own vehicle captured by the own vehicle V (forward image capture unit 13) at a position P2 forward of the position P1 illustrated in FIG. 5. The image includes the road-to-be-traveled R. FIG. 8 is an example of feature points extracted from the image illustrated in FIG. 7. Each circle in FIG. 8 represents a feature point.

For example, when the feature points illustrated in FIG. 6 and FIG. 8 are extracted, the road-to-be-traveled width measurement unit 17c calculates a road-to-be-traveled width WA (see FIG. 8) being the road width of the road-to-be-traveled R, based on the extracted feature points (coordinates).

The passable road width acquisition unit 17d configured to acquire a passable road width WB (see FIG. 4) being a road width passable by the own vehicle V driven by a driver identified by the driver identification unit 17b. For example, the passable road width acquisition unit 17d acquires a passable road width WB calculated by the passable road width calculation unit 17e.

The passable road width calculation unit 17e configured to calculate a passable road width WB (for example, WB=$W_V$+α1×2) by adding the vehicle width $W_V$ (see FIG. 3) of the own vehicle V stored in the storage unit 16A and an added width for a driver identified by the driver identification unit 17b (such as the added width α1) out of the added widths a stored in the storage unit 16A (driver information table TA).

The first determination unit 17f configured to determine whether a road-to-be-traveled width WA is narrower than a passable road width WB.

When a road-to-be-traveled width WA is determined to be narrower than a passable road width WB by the first determination unit 17f, the notification unit 17g configured to give notification that the narrow road (a road-to-be-traveled the road-to-be-traveled width WA of which is determined to be narrower than the passable road width WB by the first determination unit 17f) is impassable by the own vehicle V driven by a driver identified by the driver identification unit 17b. For example, the notification unit 17g displays a notification to that effect on the display unit 14 or outputs the notification by sound (for example, outputs a warning sound) from an on-vehicle speaker (unillustrated) in the own vehicle V.

The second determination unit 17h configured to determine whether a narrow road has been passed through by the own vehicle V driven by a driver identified by the driver identification unit 17b.

When a narrow road is determined, by the second determination unit 17h, to have been passed through by the own vehicle V driven by a driver identified by the driver identification unit 17b, the added width update unit 17i configured to update an added width for the driver identified by the driver identification unit 17b (such as the added width α1) out of the added widths a stored in the storage unit 16A (driver information table TA). For example, the added width update unit 17i updates the added width α for the driver identified by the driver identification unit 17b (such as the added width α1) in such a way as to decrease the added width.

For example, an updated added width is calculated by the following equation 1, and an added width for a driver identified by the driver identification unit 17b (such as the added width α1) out of the added widths a stored in the storage unit 16A (driver information table TA) is updated (overwritten) with the calculated updated added width.

$$\text{updated added width} = (((\text{vehicle width } W_V + \text{added width} \alpha \times 2) + \text{total passing-through road width } W) \div (\text{passing-through count } n+1) - \text{vehicle width } W_V) \div 2 \quad \text{(equation 1)}$$

The passing-through count counting unit 17j configured to count the number of times a narrow road has been passed through by the own vehicle V driven by a driver identified by the driver identification unit 17b. For example, the passing-through count counting unit 17j increments (for example, +1) a passing-through count for a driver identified by the driver identification unit 17b (such as a passing-through count n1) out of the passing-through counts n stored in the storage unit 16A (driver information table TA).

The third determination unit 17k configured to determine whether the number of times counted by the passing-through count counting unit 17j has reached a predetermined number of times.

The fourth determination unit 17m configured to determine whether a narrow road has been passable in the past by the own vehicle V driven by a driver identified by the driver identification unit 17b.

For example, when the position of a narrow road being a road-to-be-traveled the road-to-be-traveled width WA of which is determined to be narrower than the passable road width WB by the first determination unit 17f is stored in the storage unit 16A (road position information of a driver identified by the driver identification unit 17b in the driver information table TA), the fourth determination unit 17m determines that the narrow road has been passable in the past by the own vehicle V driven by the driver identified by the driver identification unit 17b.

Next, passing-through determination processing 1 will be described as an example of operation of the on-vehicle device 1A with the aforementioned configuration.

The passing-through determination processing 1 is processing of, for each driver, determining whether a road-to-be-traveled is passable by the own vehicle V driven by the driver.

Figure 9:
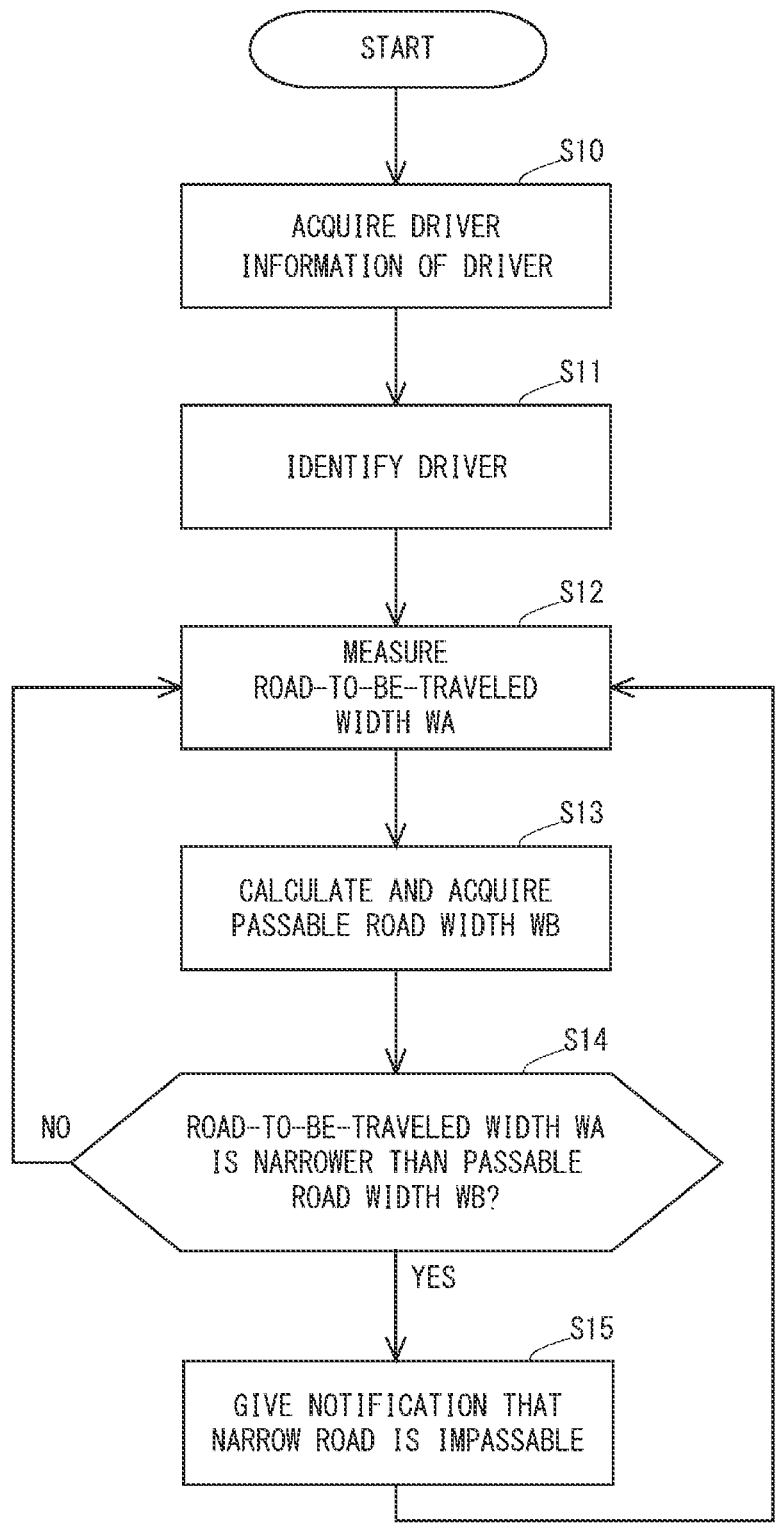
FIG. 9 is a flowchart of an operation an example (passing-through determination processing 1) of the on-vehicle device 1A.

FIG. 9 is a flowchart of an example of the operation of the on-vehicle device 1A (passing-through determination processing 1). The processing in FIG. 9 is provided by the control unit 17A (processor) executing a predetermined program read into a RAM (unillustrated) from a ROM (unillustrated) or the storage unit 16A.

It is assumed in the following description that the forward image capture unit 13 captures an image of an area ahead of the own vehicle V at a predetermined frame rate.

First, the on-vehicle device 1A (driver information acquisition unit 17a) acquires driver information of a driver of the own vehicle V (Step S10). It is assumed in this case that data representing a feature point extracted from a facial image of the driver captured by the facial image capture unit 11 is acquired as driver information of the driver of the own vehicle V.

Next, the on-vehicle device 1A (driver identification unit 17b) identifies the driver of the own vehicle V (Step S11). It is assumed in this case that the driver with the "driver information 1" (see FIG. 3) is identified as the driver of the own vehicle V by comparing (checking) the driver information acquired in Step S10 with (against) "driver information" in the driver information table TA.

Next, the on-vehicle device 1A (road-to-be-traveled width measurement unit 17c) measures a road-to-be-traveled width WA being the road width of a road-to-be-traveled (for example, see FIG. 8), based on images captured by the forward image capture unit 13 (for example, see FIG. 5 and FIG. 7) (Step S12).

Next, the on-vehicle device 1A (passable road width calculation unit 17e) calculates a passable road width WB (WB=$W_V$+α1× 2 in this case) by adding the vehicle width $W_V$ of the own vehicle V stored in the storage unit 16A and an added width for the driver identified in Step S11 (the added width α1 in this case) out of the added widths a stored in the storage unit 16A (driver information table TA) (Step S13).

Next, the on-vehicle device 1A (passable road width acquisition unit 17d) acquires a passable road width WB (see FIG. 4) being a road width passable by the own vehicle V driven by the driver identified in Step S11 (Step S13). The passable road width acquisition unit 17d acquires a passable road width WB calculated by the passable road width calculation unit 17e in this case.

Next, the on-vehicle device 1A (first determination unit 17f) determines whether the road-to-be-traveled width WA is narrower than the passable road width WB (Step S14).

Next, when the road-to-be-traveled width WA is determined to be narrower than the passable road width WB in Step S14 (Step S14: YES), the on-vehicle device 1A (notification unit 17g) gives notification that the road-to-be-traveled (narrow road) is impassable by the own vehicle V driven by the driver identified in Step S11 (Step S15). For example, the on-vehicle device 1A (notification unit 17g) displays a notification to that effect on the display unit 14 or outputs the notification by sound (for example, outputs a warning sound) from an on-vehicle speaker (unillustrated) in the own vehicle V. Thus, the on-vehicle device 1A (notification unit 17g) gives notification that the road-to-be-traveled (narrow road) is impassable to the driver.

Next, added width update processing of updating "added width α" stored in the driver information table TA will be described as an example of the operation of the on-vehicle device 1A with the aforementioned configuration.

Figure 10:
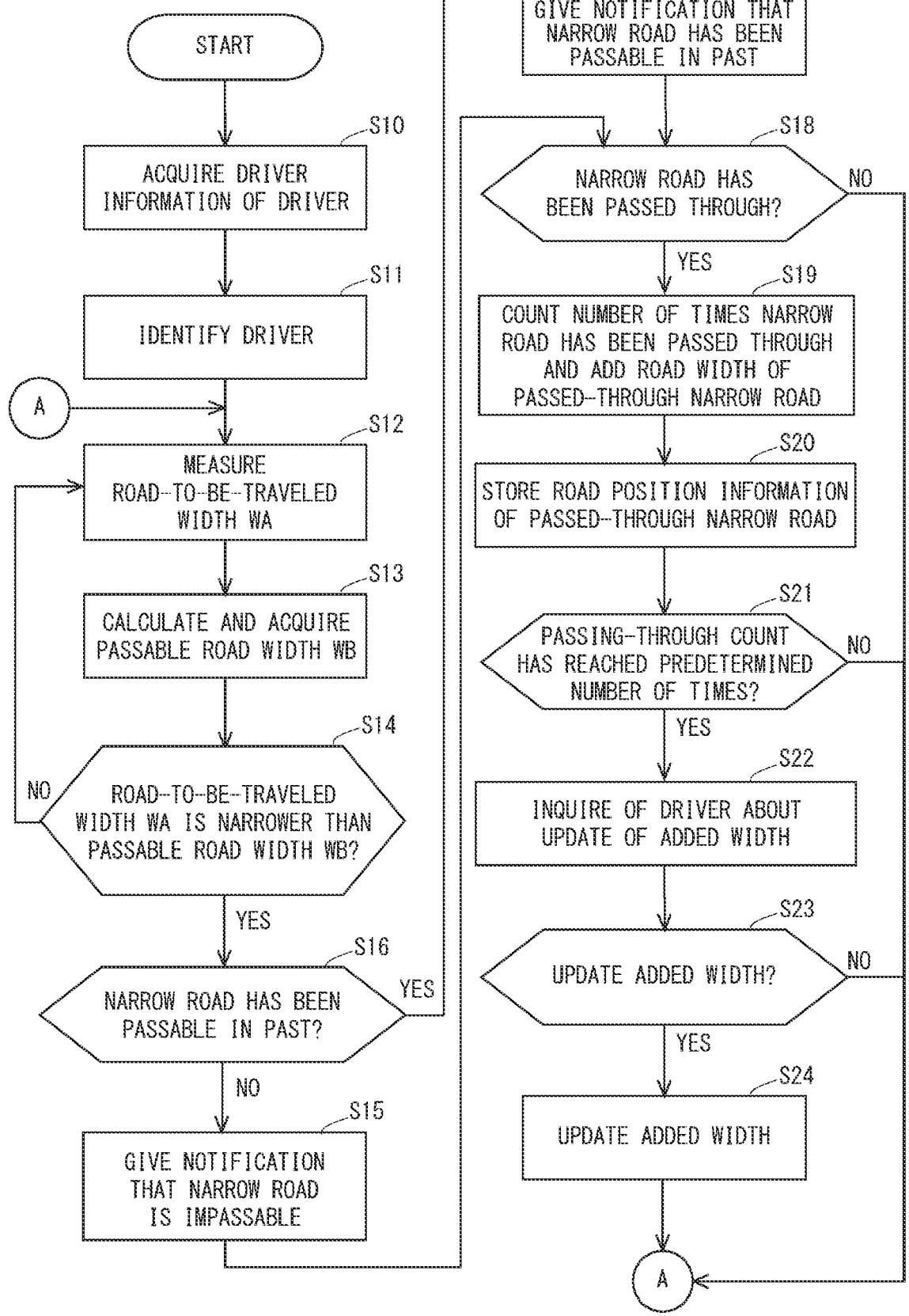
FIG. 10 is a flowchart acquired by adding added width update processing (Steps S16 to S23) to FIG. 9.

FIG. 10 is a flowchart acquired by adding the added width update processing (Steps S16 to S23) to FIG. 9. The added width update processing (Steps S16 to S23) being the difference from FIG. 9 will be mainly described below.

Following the processing in Step S14, the on-vehicle device 1A (fourth determination unit 17m) determines whether the road-to-be-traveled (narrow road) has been passable in the past by the own vehicle V driven by the driver identified in Step S11 (Step S16).

For example, when the position of the narrow road being a road-to-be-traveled the road-to-be-traveled width WA of which is determined to be narrower than the passable road width WB in Step S14 is stored in the storage unit 16A (road position information of the driver identified in Step S11 in the driver information table TA), the fourth determination unit 17m determines that the narrow road has been passable in the past by the own vehicle V driven by the driver identified by the driver identification unit 17b.

When the narrow road is determined to have been passable in the past by the own vehicle V driven by the driver identified in Step S11 as a result of the determination in Step S16 (Step S16: YES), the on-vehicle device 1A (notification unit 17g) gives notification that the narrow road has been passable in the past by the own vehicle V driven by the driver identified in Step S11 (Step S17). For example, the on-vehicle device 1A (notification unit 17g) displays a notification to that effect on the display unit 14 or outputs the notification by sound from the on-vehicle speaker (unillustrated) in the own vehicle V. Thus, the on-vehicle device 1A (notification unit 17g) gives notification that the narrow road has been passable in the past to the driver.

On the other hand, when the narrow road is determined to have been impassable in the past by the own vehicle V driven by the driver identified in Step S11 as a result of the determination in Step S16 (Step S16: NO), the on-vehicle device 1A (notification unit 17g) gives notification that the narrow road is impassable by the own vehicle V driven by the driver identified in Step S11 (Step S15).

Next, the on-vehicle device 1A (second determination unit 17h) determines whether the narrow road has been passed through by the own vehicle V driven by the driver identified in Step S11 (Step S18).

When the narrow road is determined to have been passed through by the own vehicle V driven by the driver identified in Step S11 as a result of the determination in Step S18 (Step S18: YES), the on-vehicle device 1A (passing-through count counting unit 17j) counts the number of times the narrow road has been passed through by the own vehicle V driven by the driver identified in Step S11 (Step S19). For example, the passing-through count counting unit 17j increments (for example, +1) the passing-through count for the driver identified by the driver identification unit 17b (the passing-through count n1 in this case) out of the passing-through counts n stored in the storage unit 16A (driver information table TA). Further, the road width of the narrow road determined to have been passed through in Step S18 is added to the total passing-through road width of the driver identified in Step S11 (a total passing-through road width W1 in this case) out of the total passing-through road widths W stored in the storage unit 16A (driver information table TA) (Step S19).

Next, road position information indicating the position of the narrow road determined to have been passable in Step S18 is stored in "road position information" of the driver identified in Step S11 in the storage unit 16A (driver information table TA) (Step S20).

Next, the on-vehicle device 1A (third determination unit 17k) determines whether the passing-through count counted in Step S19 has reached a predetermined number of times (Step S21).

When the passing-through count counted in Step S19 is determined to have reached the predetermined number of times as a result of the determination in Step S21 (Step S21: YES), the on-vehicle device 1A (notification unit 17g) inquires of the driver about update of (whether to update) the added width (Step S22). For example, the on-vehicle device 1A (notification unit 17g) displays an inquiry to that effect on the display unit 14 or outputs the inquiry by sound from the on-vehicle speaker (unillustrated) in the own vehicle V.

When the added width is to be updated in response to the inquiry in Step S22 (Step S23: YES), for example, when the driver provides an input about update of the added width through the input unit 15, the on-vehicle device 1A (added width update unit 17i) updates the added width for the driver identified in Step S11 (the added width α1 in this case) out of the added widths a stored in the storage unit 16A (driver information table TA) (Step S24). For example, an updated added width is calculated in accordance with the aforementioned equation 1, and the added width for the driver identified in Step S11 (the added width α1 in this case) out of the added widths a stored in the storage unit 16A (driver information table TA) is updated (overwritten) with the calculated updated added width. From there onward, the processing in Steps S12 to S24 is repeatedly executed. At that time, the passable road width calculation unit 17e calculates the passable road width WB by using the updated added width α (Step S13).

As described above, the second example embodiment enables determination of, for each driver, whether a road-to-be-traveled is passable by the own vehicle V driven by the driver (Step S14) and notification of the determination result (Step S15). Thus, the driver can previously recognize that the road-to-be-traveled (narrow road) is impassable by the own vehicle V.

The reason is that, for each driver, "added width α" added to the vehicle width $W_V$ of the own vehicle V in accordance with the driving proficiency and the driving level of the driver is stored in the storage unit 16A (driver information table TA).

Further, the second example embodiment enables suppression of unnecessary notification.

The reason is that when a road-to-be-traveled (narrow road) is determined to have been passed through by the own vehicle V driven by the driver identified in Step S11 (Step S18: YES), the added width for the driver identified in Step S11 out of the added widths a stored in the storage unit 16A (driver information table TA) is updated (learned).

Further, according to the second example embodiment, road position information indicating the position of the narrow road determined to have been passable in Step S18 is stored in "road position information" of the driver identified in Step S11 in the storage unit 16A (driver information table TA) (Step S20), and therefore when the narrow road is to be passed through again, notification that the narrow road has been passed through in the past can be previously given to the driver (Step S16: YES and Step S17).

Next, modified examples will be described.

While an example of performing the processing of inquiring of a driver about update of (whether to update) an added width α before updating the added width (Steps S22 and S23) has been described in the second example embodiment, the update processing is not limited thereto. For example, the processing of inquiring of a driver about update of (whether to update) an added width (Steps S22 and S23) may be omitted.

Steps S10 to S24 in the aforementioned second example embodiment are not limited to be performed in this order. For example, Step S12 and Step S13 may be performed in an order of Step S13 and Step S12. Further, Step S19 and Step S20 may be performed in an order of Step S20 and Step S19.

Third Example Embodiment

An on-vehicle device 1B being a third example embodiment of the present invention will be described below with reference to attached drawings.
Corresponding components in the diagrams are given the same signs, and redundant description thereof is omitted.

First, a configuration of the on-vehicle device 1B will be described by using FIG. 11.

Figure 11:
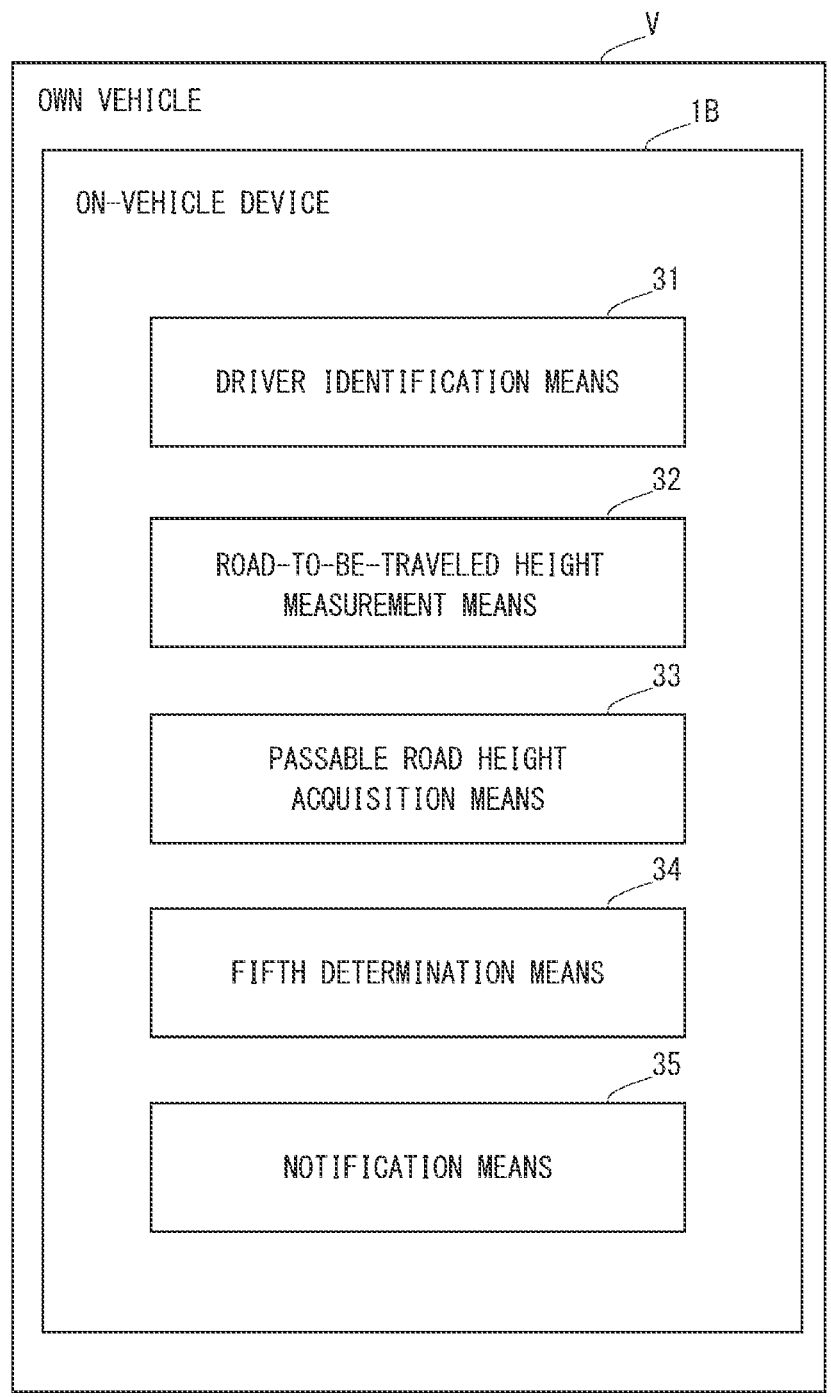
FIG. 11 is a schematic configuration diagram of an on-vehicle device 1B.

FIG. 11 is a schematic configuration diagram of the on-vehicle device 1B. It is hereinafter assumed that the on-vehicle device 1B is equipped on an own vehicle V.

As illustrated in FIG. 11, the on-vehicle device 1B includes a driver identification means 31 for identifying a driver, a road-to-be-traveled height measurement means 32 for measuring a road-to-be-traveled height HA being the height from a road surface of a road-to-be-traveled to an object over the road surface, a passable road height acquisition means 33 for acquiring a passable road height HB being the height from a road surface of a road passable by the own vehicle V driven by a driver identified by the driver identification means 31 to an object over the road surface, a fifth determination means 34 for determining whether the road-to-be-traveled height HA is lower than the passable road height HB, and a notification means 35 for, when the road-to-be-traveled height HA is determined to be lower than the passable road height HB by the fifth determination means 34, giving notification that a narrow road being the road-to-be-traveled the road-to-be-traveled height HA of which is determined to be lower than the passable road height HB by the fifth determination means 34 is impassable by the own vehicle V driven by the driver identified by the driver identification means 31.

The third example embodiment enables, for each driver, determination of whether a road-to-be-traveled is passable by the own vehicle V driven by the driver and notification of the determination result. Thus, the driver can previously recognize that the road-to-be-traveled (narrow road) is impassable by the own vehicle V.

Fourth Example Embodiment

The on-vehicle device 1B according to the third example embodiment will be described in more detail below as a fourth example embodiment of the present invention.

Figure 12:
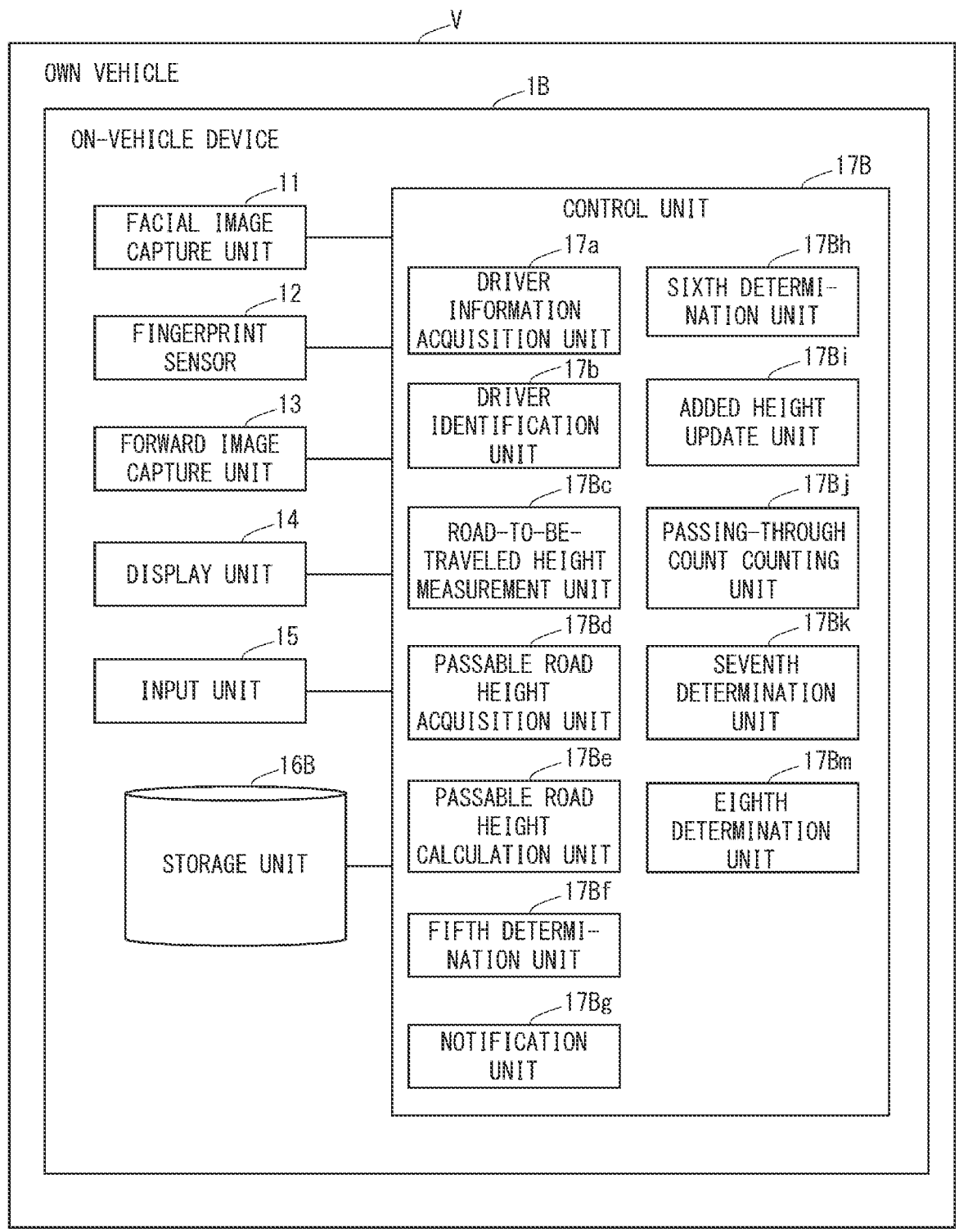
FIG. 12 is a detailed configuration diagram of the on-vehicle device 1B.

FIG. 12 is a detailed configuration diagram of the on-vehicle device 1B. It is hereinafter assumed that the on-vehicle device 1B is equipped on the own vehicle V.

As illustrated in FIG. 12, the on-vehicle device 1B mainly includes a facial image capture unit 11, a fingerprint sensor 12, a forward image capture unit 13, a display unit 14, an input unit 15, a storage unit 16B, and a control unit 17B as a hardware configuration. The facial image capture unit 11, the fingerprint sensor 12, the forward image capture unit 13, the display unit 14, and the input unit 15 are already described in the second example embodiment, and therefore description thereof is omitted.

For example, the storage unit 16B is a hard disk device.

Figure 13:
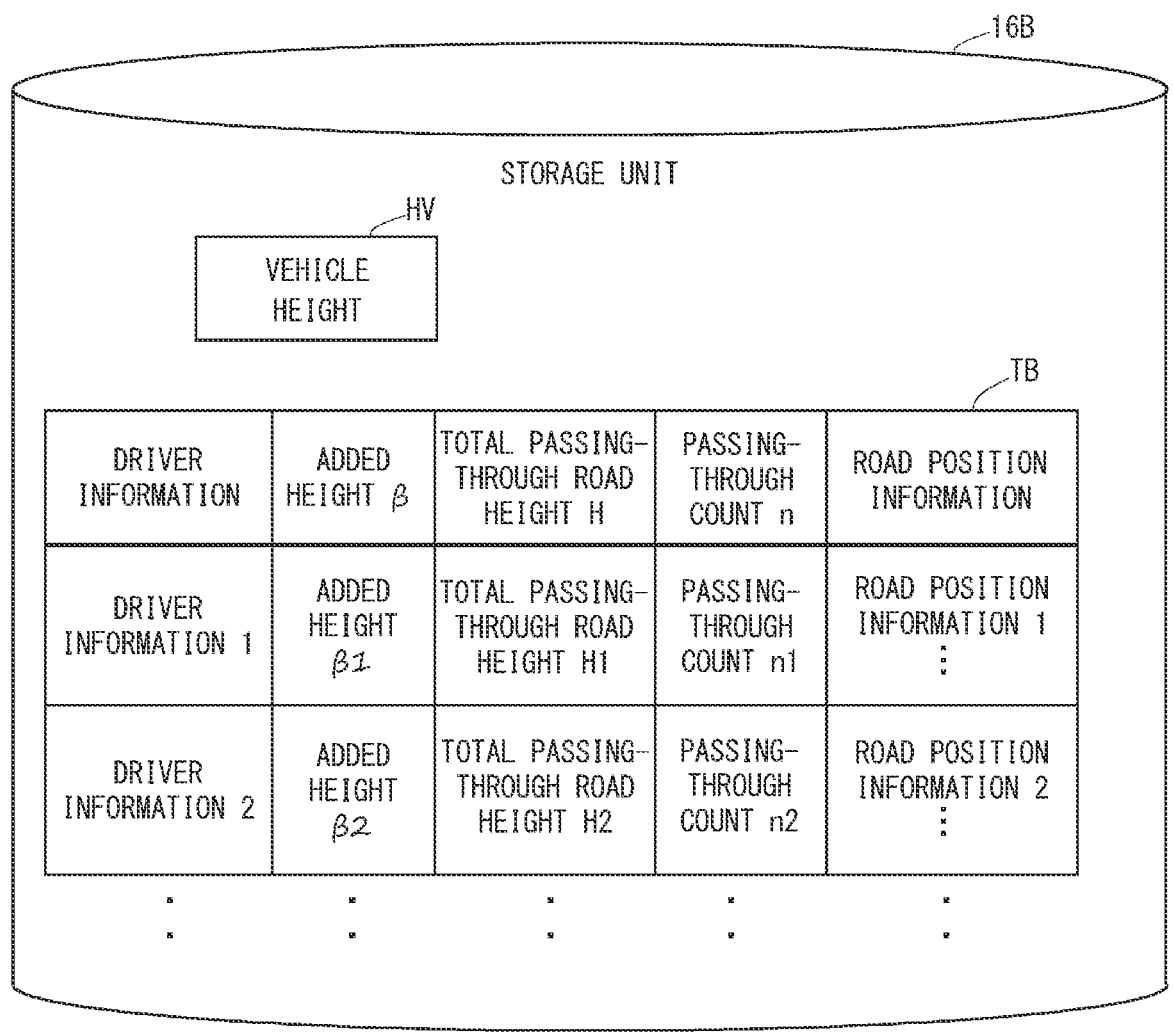
FIG. 13 is an example of various types of data stored in a storage unit 16B.

FIG. 13 is an example of various types of data stored in the storage unit 16B.

As illustrated in FIG. 13, the storage unit 16B configured to store a vehicle height $H_V$ and a driver information table TB. The storage unit 16B is an example of a vehicle height storage means, an added height storage means, and a road position information storage means according to the present invention.

As illustrated in FIG. 4, the vehicle height $H_V$ represents the vehicle height of the own vehicle V. It is assumed in the fourth example embodiment that the vehicle height $H_V$ is previously stored in the storage unit 16B.

As illustrated in FIG. 13, the driver information table TB includes "driver information," "added height β," "total passing-through road height H," "passing-through count n," and "road position information" as items.

"Driver information" is already described in the second example embodiment, and therefore description thereof is omitted.

An added height (margin) to be added to the vehicle height $H_V$ of the own vehicle V is stored in "added height β." For example, a driver inputs (sets) a value based on the driving proficiency and the driving level of the driver to "added height β" through the input unit 15. For example, "added height β" includes any numerical value between 5 and 100 cm. The input added height is stored in "added height β" for the relevant driver. The input unit 15 is an example of an added height setting means according to the present invention. It is assumed in the fourth example embodiment that added heights of two drivers (an added height β1 and an added height β2) are previously stored in "added height β" as illustrated in FIG. 13.

The road height of a narrow road determined, by a fifth determination unit 17Bf to be described later, to be passed through by the own vehicle V is added and stored in "total passing-through road height H." A narrow road refers to a road-to-be-traveled the road-to-be-traveled height HA of which is determined to be lower than the passable road height HB (see FIG. 4) by the fifth determination unit 17Bf to be described later. Note that "0" is stored in "total passing-through road height H" as an initial value.

The number of times a narrow road has been passed through by the own vehicle V driven by a driver identified by a driver identification unit 17b is stored in "passing-through count n." Note that "0" is stored in "passing-through count n" as an initial value.

Road position information indicating the position of a narrow road having been passable in the past by the own vehicle V driven by a driver identified by the driver identification unit 17b is stored in "road position information."

For example, the control unit 17B is an electronic control unit (ECU). While not being illustrated, the control unit 17B includes a processor. For example, the processor is a CPU. One processor may be included, or a plurality of processors may be included. By executing a predetermined program read from a nonvolatile memory such as a ROM (unillustrated) into a RAM (unillustrated), the processor functions as a driver information acquisition unit 17a, the driver identification unit 17b, a road-to-be-traveled height measurement unit 17Bc, a passable road height acquisition unit 17Bd, a passable road height calculation unit 17Be, the fifth determination unit 17Bf, a notification unit 17Bg, a sixth determination unit 17Bh, an added height update unit 17Bi, a passing-through count counting unit 17Bj, a seventh determination unit 17Bk, and an eighth determination unit 17Bm, as illustrated in FIG. 12. The units may be provided by hardware in part or in whole. The driver identification unit 17b is an example of the driver identification means 31, the road-to-be-traveled height measurement unit 17Bc is an example of the road-to-be-traveled height measurement means 32, the passable road height acquisition unit 17Bd is an example of the passable road height acquisition means 33, the fifth determination unit 17Bf is an example of the fifth determination means 34, and the notification unit 17Bg is an example of the notification means 35.

The driver information acquisition unit 17a and the driver identification unit 17b are already described in the second example embodiment, and therefore description thereof is omitted.

The road-to-be-traveled height measurement unit 17Bc is configured to measure a road-to-be-traveled height HA being the height from a road surface of a road-to-be-traveled to an object over the road surface (such as an overhead object). For example, the road-to-be-traveled height measurement unit 17Bc measures a road-to-be-traveled height HA being the height from a road surface of a road-to-be-traveled to an object over the road surface, based on an image captured by the forward image capture unit 13.

For example, a technology called simultaneous localization and mapping (SLAM) may be used for measurement of a road-to-be-traveled height HA. When SLAM is used, the road-to-be-traveled height measurement unit 17Bc analyzes an image captured by the forward image capture unit 13, extracts a feature point, calculates the distance to the extracted feature point, determines coordinates of the feature point, and calculates a road-to-be-traveled height HA, based on the determined feature point. The distance to each feature point can be found by a trigonometric parallax survey. Movement of the own vehicle V forms a triangle including three points being a point before the movement, a point after the movement, and a feature point. The distance to the feature point can be calculated based on the length (moved distance) of one side of the triangle and the two adjacent angles.

The passable road height acquisition unit 17Bd is configured to acquire a passable road height HB (see FIG. 4) being the height from a road surface of a road passable by the own vehicle V driven by a driver identified by the driver identification unit 17b to an object over the road surface. For example, the passable road height acquisition unit 17Bd acquires a passable road height HB calculated by the passable road height calculation unit 17Be.

The passable road height calculation unit 17Be is configured to calculate a passable road height HB (for example, HB=$H_V$+β1) by adding the vehicle height $H_V$ (see FIG. 13) of the own vehicle V stored in the storage unit 16B and an added height for a driver identified by the driver identification unit 17b (such as the added height β1) out of the added heights β stored in the storage unit 16B (driver information table TB).

The fifth determination unit 17Bf is configured to determine whether a road-to-be-traveled height HA is lower than a passable road height HB.

When a road-to-be-traveled height HA is determined to be lower than a passable road height HB by the fifth determination unit 17Bf, the notification unit 17Bg is configured to give notification that the narrow road (a road-to-be-traveled the road-to-be-traveled height HA of which is determined to be lower than the passable road height HB by the fifth determination unit 17Bf) is impassable by the own vehicle V driven by a driver identified by the driver identification unit 17b. For example, the notification unit 17Bg displays a notification to that effect on the display unit 14 or outputs the notification by sound (for example, outputs a warning sound) from an on-vehicle speaker (unillustrated) in the own vehicle V.

The sixth determination unit 17Bh is configured to determine whether a narrow road has been passed through by the own vehicle V driven by a driver identified by the driver identification unit 17b.

When a narrow road is determined, by the sixth determination unit 17Bh, to have been passed through by the own vehicle V driven by a driver identified by the driver identification unit 17b, the added height update unit 17Bi is configured to update an added height of the driver identified by the driver identification unit 17b (such as the added height β1) out of the added heights β stored in the storage unit 16B (driver information table TB). For example, the added height update unit 17Bi updates the added height β of the driver identified by the driver identification unit 17b (such as the added height β1) in such a way as to decrease the added height.

For example, an updated added height is calculated by the following equation 2, and an added height for a driver identified by the driver identification unit 17b (such as the added height β1) out of the added heights β stored in the storage unit 16B (driver information table TB) is updated (overwritten) with the calculated updated added height.

updated added height=((vehicle height $H_V$+added height β)+total passing-through road height $H$)÷passing-through count $n$+1−vehicle height $H_V$  (equation 2)

The passing-through count counting unit 17Bj counts the number of times a narrow road has been passed through by the own vehicle V driven by a driver identified by the driver identification unit 17b. For example, the passing-through count counting unit 17Bj increments (for example, +1) a passing-through count for a driver identified by the driver identification unit 17b (such as a passing-through count n1) out of the passing-through counts n stored in the storage unit 16B (driver information table TB).

The seventh determination unit 17Bk is configured to determine whether the number of times counted by the passing-through count counting unit 17Bj has reached a predetermined number of times.

The eighth determination unit 17Bm is configured to determine whether a narrow road has been passable in the past by the own vehicle V driven by a driver identified by the driver identification unit 17b.

For example, when the position of a narrow road being a road-to-be-traveled the road-to-be-traveled height HA of which is determined to be lower than the passable road height HB by the fifth determination unit 17Bf is stored in the storage unit 16B (road position information of a driver identified by the driver identification unit 17b in the driver information table TB), the eighth determination unit 17Bm determines that the narrow road has been passable in the past by the own vehicle V driven by the driver identified by the driver identification unit 17b.

Next, passing-through determination processing 2 will be described as an example of operation of the on-vehicle device 1B with the aforementioned configuration.

The passing-through determination processing 2 is processing of, for each driver, determining whether a road-to-be-traveled is passable by the own vehicle V driven by the driver.

Figure 14:
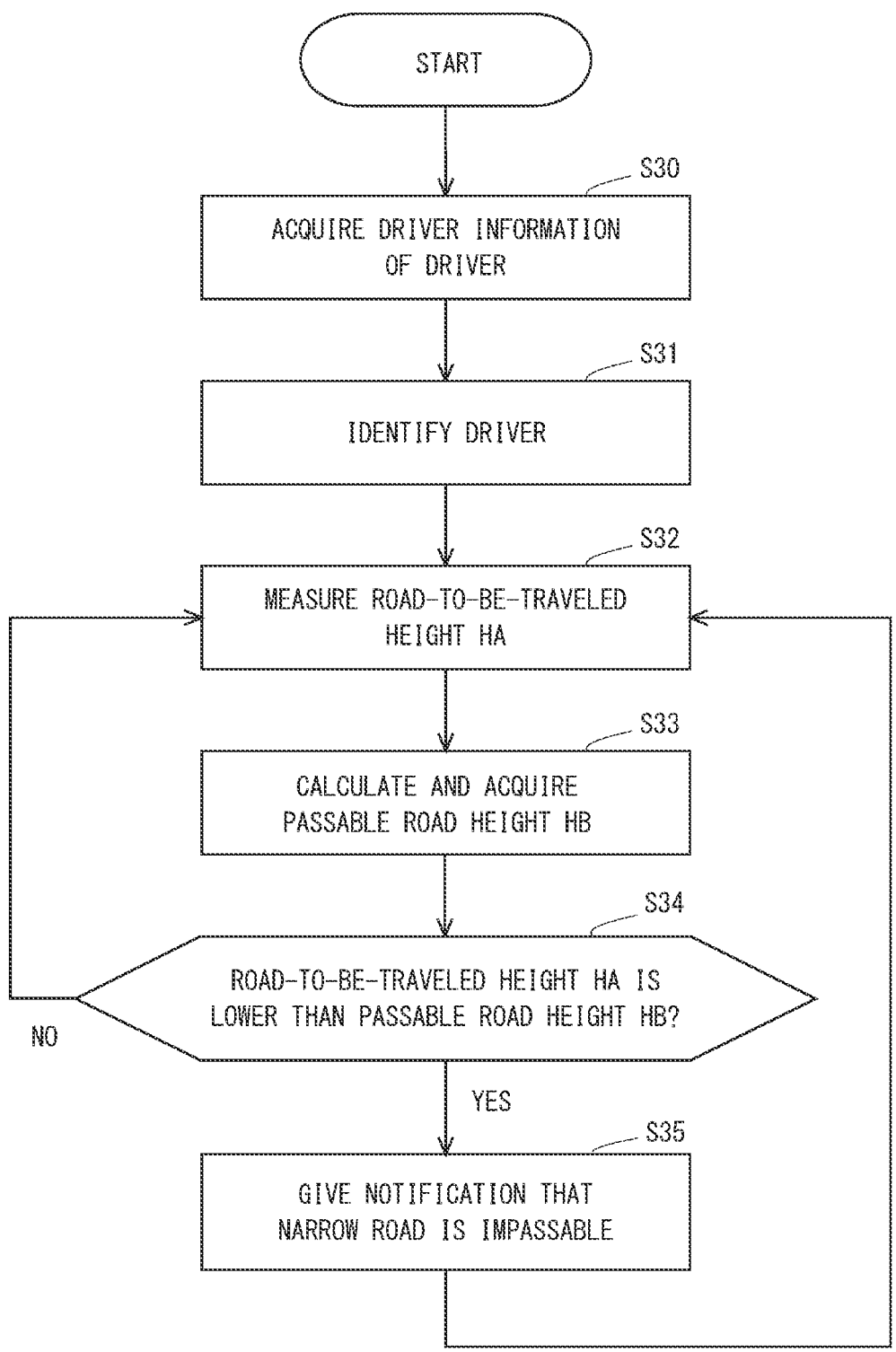
FIG. 14 is a flowchart of an operation an example (passing-through determination processing 2) of the on-vehicle device 1B.

FIG. 14 is a flowchart of an example of the operation of the on-vehicle device 1B (the passing-through determination processing 2). The processing in FIG. 14 is provided by the control unit 17B (processor) executing a predetermined program read into a RAM (unillustrated) from a ROM (unillustrated) or the storage unit 16B.

It is assumed in the following description that the forward image capture unit 13 captures an image of an area ahead of the own vehicle V at a predetermined frame rate.

First, the on-vehicle device 1B (driver information acquisition unit 17a) acquires driver information of a driver of the own vehicle V (Step S30). It is assumed in this case that data representing a feature point extracted from a facial image of the driver captured by the facial image capture unit 11 are acquired as driver information of the driver of the own vehicle V.

Next, the on-vehicle device 1B (driver identification unit 17b) identifies the driver of the own vehicle V (Step S31). It is assumed in this case that a driver with "driver information 1" (see FIG. 13) is identified as the driver of the own vehicle V by comparing (checking) the driver information acquired in Step S30 with (against) "driver information" in the driver information table TB.

Next, the on-vehicle device 1B (road-to-be-traveled height measurement unit 17Bc) measures a road-to-be-traveled height HA being the height from a road surface of a road-to-be-traveled to an object over the road surface, based on images captured by the forward image capture unit 13 (Step S32).

Next, the on-vehicle device 1B (passable road height calculation unit 17Be) calculates a passable road height HB (HB=$H_V$+β in this case) acquired by adding the vehicle height $H_V$ of the own vehicle V stored in the storage unit 16B and an added height of the driver identified in Step S31 (the added height β1 in this case) out of the added heights β stored in the storage unit 16B (driver information table TB) (Step S33).

Next, the on-vehicle device 1B (passable road height acquisition unit 17Bd) acquires a passable road height HB (see FIG. 4) being the height from a road surface of a road passable by the own vehicle V driven by the driver identified in Step S31 to an object over the road surface (Step S33). The passable road height acquisition unit 17Bd acquires a passable road height HB calculated by the passable road height calculation unit 17Be in this case.

Next, the on-vehicle device 1B (fifth determination unit 17Bf) determines whether the road-to-be-traveled height HA is lower than the passable road height HB (Step S34).

Next, when the road-to-be-traveled height HA is determined to be lower than the passable road height H in Step S34 (Step S34: YES), the on-vehicle device 1B (notification unit 17Bg) gives notification that the road-to-be-traveled (narrow road) is impassable by the own vehicle V driven by the driver identified in Step S31 (Step S35). For example, the on-vehicle device 1B (notification unit 17Bg) displays a notification to that effect on the display unit 14 or outputs the notification by sound (for example, outputs a warning sound) from the on-vehicle speaker (unillustrated) in the own vehicle V. Thus, the on-vehicle device 1B (notification unit 17Bg) gives notification that the road-to-be-traveled (narrow road) is impassable to the driver.

Next, added height update processing of updating "added height" stored in the driver information table TB will be described as an example of the operation of the on-vehicle device 1B with the aforementioned configuration.

Figure 15:
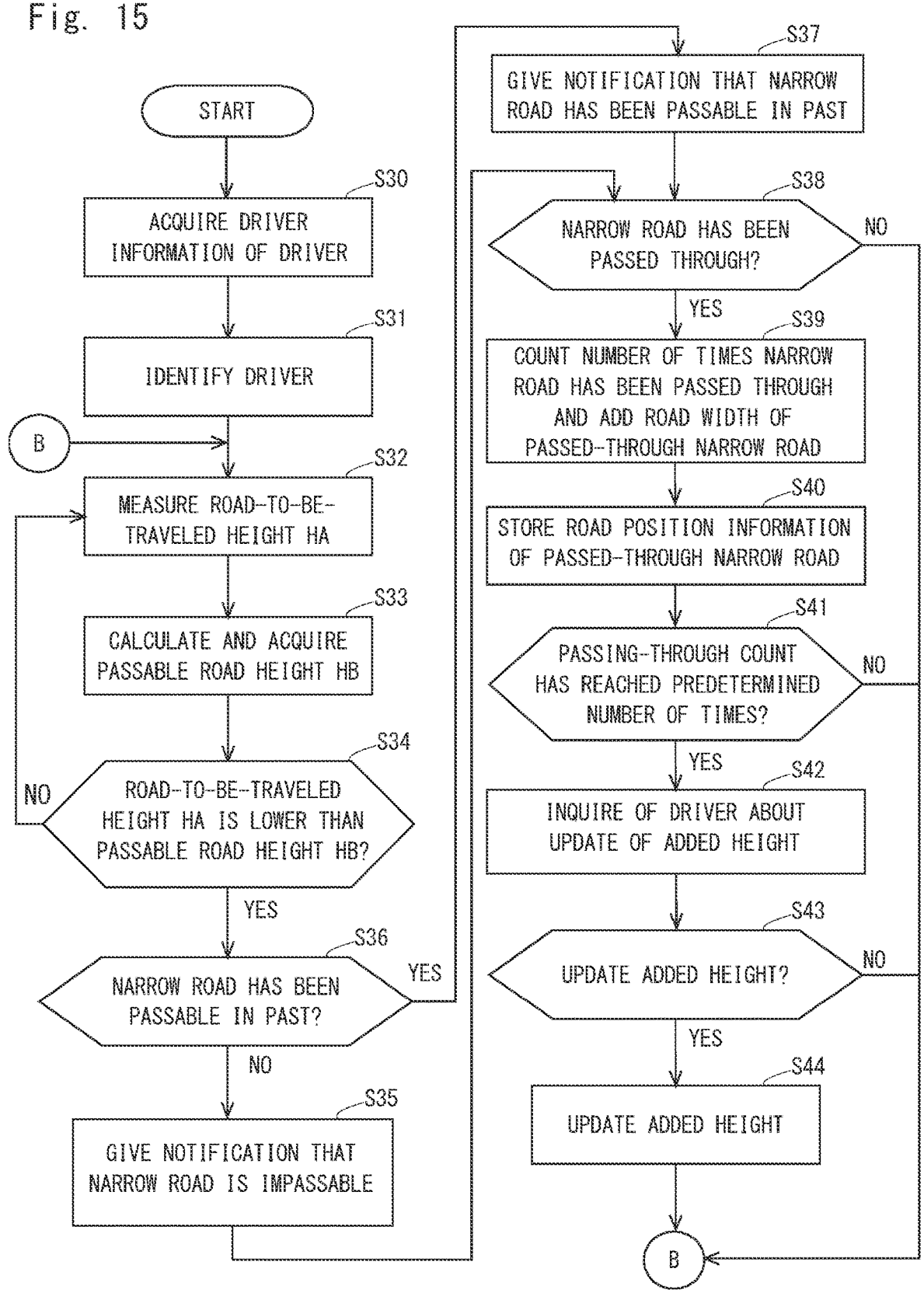
FIG. 15 is a flowchart acquired by adding added height update processing (Steps S36 to S43) to FIG. 14.

FIG. 15 is a flowchart acquired by adding the added height update processing (Steps S36 to S44) to FIG. 14. The added height update processing (Steps S36 to S44) being the difference from FIG. 14 will be mainly described below.

Following the processing in Step S34, the on-vehicle device 1B (eighth determination unit 17Bm) determines whether the road-to-be-traveled (narrow road) has been passable in the past by the own vehicle V driven by the driver identified in Step S31 (Step S36).

For example, when the position of the narrow road being the road-to-be-traveled the road-to-be-traveled height HA of which is determined to be lower than the passable road height HB in Step S34 is stored in the storage unit 16B (road position information of the driver identified in Step S31 in the driver information table TB), the eighth determination unit 17Bm determines that the narrow road has been passable in the past by the own vehicle V driven by the driver identified by the driver identification unit 17b.

When the narrow road is determined to have been passable in the past by the own vehicle V driven by the driver identified in Step S31 as a result of the determination in Step S36 (Step S36: YES), the on-vehicle device 1B (notification unit 17Bg) gives notification that the narrow road has been passable in the past by the own vehicle V driven by the driver identified in Step S31 (Step S37). For example, the on-vehicle device 1B (notification unit 17Bg) displays a notification to that effect on the display unit 14 or outputs the notification by sound from the on-vehicle speaker (unillustrated) in the own vehicle V. Thus, the on-vehicle device 1B (notification unit 17Bg) gives notification that the narrow road has been passable in the past to the driver.

On the other hand, when the narrow road is determined to have been impassable in the past by the own vehicle V driven by the driver identified in Step S31 as a result of the determination in Step S36 (Step S36: NO), the on-vehicle device 1B (notification unit 17Bg) gives notification that the narrow road is impassable by the own vehicle V driven by the driver identified in Step S31 (Step S35).

Next, the on-vehicle device 1B (sixth determination unit 17Bh) determines whether the narrow road has been passed through by the own vehicle V driven by the driver identified in Step S31 (Step S38).

When the narrow road is determined to have been passed through by the own vehicle V driven by the driver identified in Step S31 as a result of the determination in Step S38 (Step S38: YES), the on-vehicle device 1B (passing-through count counting unit 17Bj) counts the number of times the narrow road has been passed through by the own vehicle V driven by the driver identified in Step S31 (Step S39). For example, the passing-through count counting unit 17Bj increments (for example, +1) the passing-through count for the driver identified by the driver identification unit 17b (the passing-through count n1 in this case) out of the passing-through counts n stored in the storage unit 16B (driver information table TB). Further, the road width of the narrow road determined to have been passed through in Step S38 is added to the total passing-through road height of the driver identified in Step S31 (a total passing-through road height H1 in this case) out of the total passing-through road heights H stored in the storage unit 16B (driver information table TB) (Step S39).

Next, road position information indicating the position of the narrow road determined to have been passable in Step S38 is stored in "road position information" of the driver identified in Step S31 in the storage unit 16B (driver information table TB) (Step S40).

Next, the on-vehicle device 1B (seventh determination unit 17Bk) determines whether the passing-through count counted in Step S39 has reached a predetermined number of times (Step S41).

When the passing-through count counted in Step S39 is determined to have reached the predetermined number of times as a result of the determination in Step S41 (Step S41:

YES), the on-vehicle device 1B (notification unit 17Bg) inquires of the driver about update of (whether to update) the added height (Step S42). For example, the on-vehicle device 1B (notification unit 17Bg) displays an inquiry to that effect on the display unit 14 or outputs the inquiry by sound from the on-vehicle speaker (unillustrated) in the own vehicle V.

When the added height is to be updated in response to the inquiry in Step S42 (Step S43: YES), for example, when the driver provides an input about update of the added height through the input unit 15, the on-vehicle device 1B (added height update unit 17Bi) updates the added height of the driver identified in Step S31 (the added height β1 in this case) out of the added heights β stored in the storage unit 16B (driver information table TB) (Step S44). For example, the updated added height is calculated in accordance with the aforementioned equation 2, and the added height of the driver identified in Step S31 (the added height β1 in this case) out of the added heights β stored in the storage unit 16B (driver information table TB) is updated (overwritten) with the calculated updated added height. From there onward, the processing in Steps S32 to S44 is repeatedly executed. At that time, the passable road height calculation unit 17Be calculates the passable road height HB by using the updated added height β (Step S33).

As described above, the fourth example embodiment enables, for each driver, determination of whether a road-to-be-traveled is passable by the own vehicle V driven by the driver (Step S34) and notification of the determination result (Step S35). Thus, the driver can previously recognize that the road-to-be-traveled (narrow road) is impassable by the own vehicle V.

The reason is that, for each driver, "added height β" added to the vehicle height $H_V$ of the own vehicle V in accordance with the driving proficiency and the driving level of the driver is stored in the storage unit 16B (driver information table TB).

Further, the fourth example embodiment enables suppression of unnecessary notification.

The reason is that when a road-to-be-traveled (narrow road) is determined to have been passed through by the own vehicle V driven by the driver identified in Step S31 (Step S38: YES), the added height of the driver identified in Step S31 out of the added heights β stored in the storage unit 16B (driver information table TB) is updated (learned).

Further, according to the fourth example embodiment, road position information indicating the position of the narrow road determined to have been passable in Step S38 is stored in "road position information" of the driver identified in Step S31 in the storage unit 16B (driver information table TB) (Step S40), and therefore when the narrow road is to be passed through again, notification that the narrow road has been passed through in the past can be previously given to the driver (Step S36: YES and Step S37).

Next, modified examples will be described.

While an example of performing the processing of inquiring of a driver about update of (whether to update) an added height β before updating the added height (Steps S42 and S43) has been described in the aforementioned fourth example embodiment, the update processing is not limited thereto. For example, the processing of inquiring of a driver about update of (whether to update) an added height (Steps S42 and S43) may be omitted.

Steps S30 to S44 in the aforementioned fourth example embodiment are not limited to be performed in this order. For example, Step S32 and Step S33 may be performed in an order of Step S33 and Step S32. Further, Step S39 and Step S40 may be performed in an order of Step S40 and Step S39.

Further, while an example of separately executing the processing in the aforementioned second example embodiment (such as the passing-through determination processing 1) and the processing in the aforementioned fourth example embodiment (such as the passing-through determination processing 2) has been described, the processing in the aforementioned second example embodiment (such as the passing-through determination processing 1) and the processing in the aforementioned fourth example embodiment (such as the passing-through determination processing 2) may be executed in parallel (for example, simultaneously as is the case in multitasking).

In the aforementioned first to fourth example embodiments, programs can be stored by using various types of non-transitory computer readable media and be supplied to a computer. The non-transitory computer readable media include various types of tangible storage media. Examples of the non-transitory computer readable media include magnetic storage media (such as a flexible disk, a magnetic tape, and a hard disk drive), magneto-optical storage media (such as a magneto-optical disk), a read only memory (CD-ROM), a CD-R, a CD-R/W, semiconductor memories [such as a mask ROM, a programmable ROM (PROM), an erasable PROM (EPROM), a flash ROM, and a random access memory (RAM)]. Further, the programs may be supplied to the computer by various types of transitory computer readable media. Examples of the transitory computer readable media include an electric signal, an optical signal, and an electromagnetic wave. The transitory computer readable medium can supply a program to the computer through a wired communication channel including an electric cable and an optical fiber, or a wireless communication channel.

All numerical values indicated in the aforementioned example embodiments are exemplifications, and it is apparent that different numerical values may be used as appropriate.

The aforementioned example embodiments are merely exemplifications in every aspect. The present invention shall not be interpreted in a restrictive sense by the description of the aforementioned example embodiments. The present invention may be implemented in various other forms without departing from the spirit or main features thereof.

The whole or part of the example embodiments described above may also be described as, but not limited to, the following supplementary notes.

This application is based upon and claims the benefit of priority from PCT/JP2020/008304, filed on Feb. 28, 2020, the disclosure of which is incorporated herein in its entirety by reference.

(Supplementary note 1) An on-vehicle device comprising: driver identification means for identifying a driver; road-to-be-traveled width measurement means for measuring a road-to-be-traveled width being a road width of a road-to-be-traveled; passable road width acquisition means for acquiring a passable road width being a road width passable by an own vehicle driven by a driver identified by the driver identification means; first determination means for determining whether the road-to-be-traveled width is narrower than the passable road width; and notification means for, when the road-to-be-traveled width is determined to be narrower than the passable road width by the first determination means, giving notification that a narrow road being a road-to-be-traveled the road-to-be-traveled width of which is determined to be narrower than the passable road width by the first determination means is impassable by an own vehicle driven by a driver identified by the driver identification means.

(Supplementary note 2) The on-board device according to the supplementary note 1, further comprising: vehicle width storage means for storing a vehicle width of an own vehicle; added width storage means for, for each driver, storing an added width added to a vehicle width of the own vehicle; and passable road width calculation means for calculating a passable road width by adding a vehicle width of an own vehicle stored in the vehicle width storage means and an added width for a driver identified by the driver identification means out of one or more added widths stored in the added width storage means, wherein the passable road width acquisition means acquires a passable road width calculated by the passable road width calculation means.

(Supplementary note 3) The on-board device according to the supplementary note 2, further comprising added width setting means for setting the added width, wherein the added width storage means stores an added width set by the added width setting means.

(Supplementary note 4) The on-board device according to the supplementary note 2 or 3, further comprising: second determination means for determining whether the narrow road has been passed through by an own vehicle driven by a driver identified by the driver identification means; and added width update means for, when the narrow road is determined, by the second determination means, to have been passed through by an own vehicle driven by a driver identified by the driver identification means, updating an added width for a driver identified by the driver identification means out of one or more added widths stored in the added width storage means.

(Supplementary note 5) The on-board device according to the supplementary note 4, wherein the added width update means updates an added width for a driver identified by the driver identification means in such a way that the added width takes a value smaller than that before update.

(Supplementary note 6) The on-board device according to the supplementary note 5, further comprising: passing-through count counting means for counting the number of times the narrow road has been passed through by an own vehicle driven by a driver identified by the driver identification means; and third determination means for determining whether the number of times counted by the passing-through count counting means has reached a predetermined number of times, wherein, when the counted number of times is determined to have reached a predetermined number of times by the third determination means, the added width update means updates an added width for a driver identified by the driver identification means out of one or more added widths stored in the added width storage means.

(Supplementary note 7) The on-board device according to any one of the supplementary notes 1 to 6, further comprising fourth determination means for determining whether the narrow road has been passable in the past by an own vehicle driven by a driver identified by the driver identification means, wherein, when the narrow road is determined, by the fourth determination means, to have been passable in the past by an own vehicle driven by a driver identified by the driver identification means, the notification means gives notification that the narrow road has been passable in the past by an own vehicle driven by a driver identified by the driver identification means.

(Supplementary note 8) The on-board device according to the supplementary note 7, further comprising road position information storage means for storing road position information indicating a position of the narrow road having been passable in the past by an own vehicle driven by a driver identified by the driver identification means, wherein, when a position of the narrow road is stored in the road position information storage means, the fourth determination means determines that the narrow road has been passable in the past by an own vehicle driven by a driver identified by the driver identification means.

(Supplementary note 9) The on-board device according to any one of the supplementary notes 1 to 8, further comprising image capture means for capturing an image of an area ahead of the own vehicle, wherein the road-to-be-traveled width measurement means measures a road-to-be-traveled width being a road width of a road-to-be-traveled, based on an image captured by the image capture means.

(Supplementary note 10) An on-vehicle device comprising: driver identification means for identifying a driver; road-to-be-traveled height measurement means for measuring a road-to-be-traveled height being a height from a road surface of a road-to-be-traveled to an object over the road surface; passable road height acquisition means for acquiring a passable road height being a height from a road surface of a road passable by an own vehicle driven by a driver identified by the driver identification means to an object over the road surface; fifth determination means for determining whether the road-to-be-traveled height is lower than the passable road height; and notification means for, when the road-to-be-traveled height is determined to be lower than the passable road height by the fifth determination means, giving notification that a narrow road being a road-to-be-traveled the road-to-be-traveled height of which is determined to be lower than the passable road height by the fifth determination means is impassable by an own vehicle driven by a driver identified by the driver identification means.

(Supplementary note 11) The on-board device according to the supplementary note 10, further comprising: vehicle height storage means for storing a vehicle height of an own vehicle; added height storage means for, for each driver, storing an added height added to a vehicle height of the own vehicle; and passable road height calculation means for calculating a passable road height by adding a vehicle height of an own vehicle stored in the vehicle height storage means and an added height for a driver identified by the driver identification means out of one or more added heights stored in the added height storage means, wherein the passable road height acquisition means acquires a passable road height calculated by the passable road height calculation means.

(Supplementary note 12) The on-board device according to the supplementary note 11, further comprising added height setting means for setting the added height, wherein the added height storage means stores an added height set by the added height setting means.

(Supplementary note 13) The on-board device according to the supplementary note 11 or 12, further comprising: sixth determination means for determining whether the narrow road has been passed through by an own vehicle driven by a driver identified by the driver identification means; and added height update means for, when the narrow road is determined, by the sixth determination means, to have been passed through by an own vehicle driven by a driver identified by the driver identification means, updating an added height for a driver identified by the driver identification means out of one or more added heights stored in the added height storage means.

(Supplementary note 14) The on-board device according to the supplementary note 13, wherein the added height update means updates an added height for a driver identified by the driver identification means in such a way that the added height takes a value smaller than that before update.

(Supplementary note 15) The on-board device according to the supplementary note 14, further comprising: passing-through count counting means for counting the number of times the narrow road has been passed through by an own vehicle driven by a driver identified by the driver identification means; and seventh determination means for determining whether the number of times counted by the passing-through count counting means has reached a predetermined number of times, wherein, when the counted number of times is determined to have reached a predetermined number of times by the seventh determination means, the added height update means updates an added height for a driver identified by the driver identification means out of one or more added heights stored in the added height storage means.

(Supplementary note 16) The on-board device according to any one of the supplementary notes 10 to 15, further comprising eighth determination means for determining whether the narrow road has been passable in the past by an own vehicle driven by a driver identified by the driver identification means, wherein, when the narrow road is determined, by the eighth determination means, to have been passable in the past by an own vehicle driven by a driver identified by the driver identification means, the notification means gives notification that the narrow road has been passable in the past by an own vehicle driven by a driver identified by the driver identification means.

(Supplementary note 17) The on-board device according to the supplementary note 16, further comprising road position information storage means for storing road position information indicating a position of the narrow road having been passable in the past by an own vehicle driven by a driver identified by the driver identification means, wherein, when a position of the narrow road is stored in the road position information storage means, the eighth determination means determines that the narrow road has been passable in the past by an own vehicle driven by a driver identified by the driver identification means.

(Supplementary note 18) The on-board device according to any one of the supplementary notes 10 to 17, further comprising image capture means for capturing an image of an area ahead of the own vehicle, wherein the road-to-be-traveled height measurement means measures a road-to-be-traveled height being a height from a road surface of a road-to-be-traveled to an object over the road surface, based on an image captured by the image capture means.

(Supplementary note 19) A passing-through determination method comprising: a driver identification step of identifying a driver; a road-to-be-traveled width measurement step of measuring a road-to-be-traveled width being a road width of a road-to-be-traveled; a passable road width acquisition step of acquiring a passable road width being a road width passable by an own vehicle driven by a driver identified by the driver identification means; a first determination step of determining whether the road-to-be-traveled width is narrower than the passable road width; and a notification step of, when the road-to-be-traveled width is determined to be narrower than the passable road width by the first determination step, giving notification that a narrow road being a road-to-be-traveled the road-to-be-traveled width of which is determined to be narrower than the passable road width by the first determination step is impassable by an own vehicle driven by a driver identified by the driver identification means.

(Supplementary note 20) A passing-through determination method comprising: a driver identification step of identifying a driver; a road-to-be-traveled height measurement step of measuring a road-to-be-traveled height being a height from a road surface of a road-to-be-traveled to an object over the road surface; a passable road height acquisition step of acquiring a passable road height being a height from a road surface of a road passable by an own vehicle driven by a driver identified by the driver identification means to an object over the road surface; a fifth determination step of determining whether the road-to-be-traveled height is lower than the passable road height; and a notification step of, when the road-to-be-traveled height is determined to be lower than the passable road height by the fifth determination step, giving notification that a narrow road being a road-to-be-traveled the road-to-be-traveled height of which is determined to be lower than the passable road height by the fifth determination step is impassable by an own vehicle driven by a driver identified by the driver identification means.

(Supplementary note 21) A computer readable storage medium having a program recorded thereon, the program causing an electronic device including at least one processor to execute: driver identification processing of identifying a driver; road-to-be-traveled width measurement processing of measuring a road-to-be-traveled width being a road width of a road-to-be-traveled; passable road width acquisition processing of acquiring a passable road width being a road width passable by an own vehicle driven by a driver identified by the driver identification means; first determination processing of determining whether the road-to-be-traveled width is narrower than the passable road width; and notification processing of, when the road-to-be-traveled width is determined to be narrower than the passable road width by the first determination processing, giving notification that a narrow road being a road-to-be-traveled the road-to-be-traveled width of which is determined to be narrower than the passable road width by the first determination processing is impassable by an own vehicle driven by a driver identified by the driver identification means.

(Supplementary note 22) A computer readable storage medium having a program recorded thereon, the program causing an electronic device including at least one processor to execute: driver identification processing of identifying a driver; road-to-be-traveled height measurement processing of measuring a road-to-be-traveled height being a height from a road surface of a road-to-be-traveled to an object over the road surface; passable road height acquisition processing of acquiring a passable road height being a height from a road surface of a road passable by an own vehicle driven by a driver identified by the driver identification means to an object over the road surface; fifth determination processing of determining whether the road-to-be-traveled height is lower than the passable road height; and notification processing of, when the road-to-be-traveled height is determined to be lower than the passable road height by the fifth determination processing, giving notification that a narrow road being a road-to-be-traveled the road-to-be-traveled height of which is determined to be lower than the passable road height by the fifth determination processing is impassable by an own vehicle driven by a driver identified by the driver identification means.

REFERENCE SIGNS LIST 1A, 1B ON-VEHICLE DEVICE
11 FACIAL IMAGE CAPTURE UNIT
12 FINGERPRINT SENSOR
13 FORWARD IMAGE CAPTURE UNIT
14 DISPLAY UNIT
15 INPUT UNIT
16A, 16B STORAGE UNIT
17A, 17B CONTROL UNIT
17a DRIVER INFORMATION ACQUISITION UNIT
17b DRIVER IDENTIFICATION UNIT
17c ROAD-TO-BE-TRAVELED WIDTH MEASUREMENT UNIT
17d PASSABLE ROAD WIDTH ACQUISITION UNIT
17e PASSABLE ROAD WIDTH CALCULATION UNIT
17f FIRST DETERMINATION UNIT
17g NOTIFICATION UNIT
17h SECOND DETERMINATION UNIT
17i ADDED WIDTH UPDATE UNIT
17j PASSING-THROUGH COUNT COUNTING UNIT
17k THIRD DETERMINATION UNIT
17m FOURTH DETERMINATION UNIT
17Bc ROAD-TO-BE-TRAVELED HEIGHT MEASUREMENT UNIT
17Bd PASSABLE ROAD HEIGHT ACQUISITION UNIT
17Be PASSABLE ROAD HEIGHT CALCULATION UNIT
17Bf FIFTH DETERMINATION UNIT
17Bg NOTIFICATION UNIT
17Bh SIXTH DETERMINATION UNIT
17Bi ADDED HEIGHT UPDATE UNIT
17Bj PASSING-THROUGH COUNT COUNTING UNIT
17Bk SEVENTH DETERMINATION UNIT
17Bm EIGHTH DETERMINATION UNIT
21 DRIVER IDENTIFICATION MEANS
22 ROAD-TO-BE-TRAVELED WIDTH MEASUREMENT MEANS
23 PASSABLE ROAD WIDTH ACQUISITION MEANS
24 FIRST DETERMINATION MEANS
25 NOTIFICATION MEANS
31 DRIVER IDENTIFICATION MEANS
32 ROAD-TO-BE-TRAVELED HEIGHT MEASUREMENT MEANS
33 PASSABLE ROAD HEIGHT ACQUISITION MEANS
34 FIFTH DETERMINATION MEANS
35 NOTIFICATION MEANS
HA ROAD-TO-BE-TRAVELED HEIGHT
HB PASSABLE ROAD HEIGHT
$H_V$ VEHICLE HEIGHT
R ROAD-TO-BE-TRAVELED
TA DRIVER INFORMATION TABLE
TB DRIVER INFORMATION TABLE
V OWN VEHICLE
WA ROAD-TO-BE-TRAVELED WIDTH
WB PASSABLE ROAD WIDTH
WY VEHICLE WIDTH

The invention claimed is:

1. A device mounted on a vehicle, the device comprising:
at least one memory; and
at least one processor coupled to the at least one memory, the at least one processor being configured to:
identify a driver;
measure a width of a road-to-be-traveled;
acquire a width of a road passable by the vehicle driven by the identified driver;
determine whether the width of the road-to-be-traveled is narrower than the width of a passable road;

determine whether the narrow road has been passed through by the vehicle driven by the identified driver;
count the number of times the narrow road has been passed through by the vehicle driven by the identified driver;
update an added width for the identified driver out of one or more added widths stored in an added width storage in such a way that the added width takes a value smaller than that before an update based on at least the counted number of times; and
in a case that the width of the road-to-be-traveled is determined to be narrower than the width of a passable road, provide notification that the road to be traveled is impassable by the vehicle driven by the identified driver.

2. The device mounted on a vehicle according to claim 1, wherein the at least one processor is further configured to:
store a width of the vehicle;
for each driver, store a width to be added the width of the vehicle; and
calculate the width of a passable road by adding the width of the vehicle stored and the width to be added for the identified driver out of one or more widths to be added stored,
acquire a passable road width calculated.

3. The device mounted on a vehicle according to claim 2, wherein the at least one processor is further configured to:
set the width to be added,
store the width set.

4. The device mounted on a vehicle according to claim 2, wherein the at least one processor is further configured to:
determine whether a narrow road has been passed through by the vehicle driven by the identified driver, the narrow road being a road to be traveled width of which is determined to be narrower than the width of a passable road; and
in a case that the narrow road is determined, to have been passed through by the vehicle driven by the identified driver, update the width to be added for the identified driver identified out of one or more widths to be added stored.

5. The device mounted on a vehicle according to claim 4, wherein the at least one processor is further configured to:
update the width to be added for the identified driver in such a way that the added width takes to a value smaller than that before update.

6. The device mounted on a vehicle according to claim 5, wherein the at least one processor is further configured to:
count a number of times the narrow road has been passed through by the vehicle driven by the identified driver; and
determine whether the number of times counted has reached a predetermined number of times,
wherein, in a case that the counted number of times is determined to have reached a predetermined number of times, update the width added for the identified driver out of one or more widths to be added stored.

7. The device mounted on a vehicle according to claim 1, wherein the at least one processor is further configured to:
determine whether a narrow road has been passable in the past by the vehicle driven by the identified driver, the narrow road being a road to be traveled with a width determined to be narrower than the width of a passable road,
wherein, in a case that the narrow road is determined, to have been passable in the past by the vehicle driven by the identified driver, provide notification that the narrow road has been passable in the past by the vehicle driven by the identified driver.

8. The device mounted on a vehicle according to claim 7, wherein the at least one processor is further configured to:
store road position information indicating a position of the narrow road having been passable in the past by the driven by the identified driver,
wherein, in a case that a position of the narrow road is stored, determine that the narrow road has been passable in the past by the vehicle driven by the identified driver.

9. A device mounted on a vehicle, the device comprising:
at least one memory; and
at least one processor coupled to the at least one memory, the at least one processor being configured to:
identify a driver;
measure a height from a road surface of a road-to-be-traveled to an object over the road surface;
acquire a height from a road surface of a road by the vehicle driven by the identified driver to an object over the road surface;
determine whether a height of the road-to-be-traveled is lower than a height of a passable road;
determine whether the narrow road has been passed through by the vehicle driven by the identified driver;
count the number of times the narrow road has been passed through by an own vehicle driven by the identified driver;
update an added height for the identified driver out of one or more added heights stored in an added height storage in such a way that the added height takes a value smaller than that before update based on at least the counted number of times; and
in a case that the height of the road-to-be-traveled is determined to be lower than the height of a passable road, provide notification that the road to be traveled is impassable by the vehicle driven by the identified driver is.

10. The device mounted on a vehicle according to claim 9,
wherein the at least one processor is configured to:
store a vehicle height of an own vehicle;
for each driver, store an added height added to a vehicle height of the own vehicle; and
calculate a passable road height by adding a vehicle height of an own vehicle stored and an added height for the identified driver out of one or more added heights stored,
acquire a passable road height calculated.

11. The device mounted on a vehicle according to claim 10,
wherein the at least one processor is configured to:
set the added height,
store an added height set.

12. The device mounted on a vehicle according to claim 10,
wherein the at least one processor is configured to:
determine whether a narrow road has been passed through by an own vehicle driven by the identified driver, the narrow road being a road to be traveled with a width determined to be narrower than the width of a passable road; and
when the narrow road is determined, to have been passed through by an own vehicle driven by the identified driver, update an added height for a driver out of one or more added heights stored.

13. The device mounted on a vehicle according to claim 12,
wherein the at least one processor is configured to:
update an added height for the identified driver in such a way that the added height takes a value smaller than that before update.

14. The device mounted on a vehicle according to claim 13,
wherein the at least one processor is configured to:
count a number of times the narrow road has been passed through by an own vehicle driven by the identified driver; and
determine whether the number of times counted has reached a predetermined number of times,
wherein, when the counted number of times is determined to have reached a predetermined number of times, update an added height for the identified driver out of one or more added heights stored.

15. The device mounted on a vehicle according to claim 9,
wherein the at least one processor is configured to:
determine whether the narrow road has been passable in the past by an own vehicle driven by the identified driver,
wherein, when the narrow road is determined, to have been passable in the past by an own vehicle driven by the identified driver, provide notification that the narrow road has been passable in the past by an own vehicle driven by the identified driver.

16. The device mounted on a vehicle according to claim 15,
wherein the at least one processor is configured to:
store road position information indicating a position of the narrow road having been passable in the past by an own vehicle driven by the identified driver,
wherein, when a position of the narrow road is stored, determine that the narrow road has been passable in the past by an own vehicle driven by the identified driver.

17. A passing-through determination method comprising:
identifying a driver;
measuring a width of a road-to-be-traveled;
acquiring a width of a road by a vehicle driven by the identified driver;
determining whether the width of the road-to-be-traveled is narrower than the width of the passable road;
determining whether the narrow road has been passed through by the vehicle driven by the identified driver;
counting the number of times the narrow road has been passed through by the vehicle driven by the identified driver;
updating an added width for a driver out of one or more added widths stored in a added width storage in such a way that the added width takes a value smaller than that before update based on at least the counted number of times; and
in a case that the width of the road-to-be-traveled is determined to be narrower than the width of a road, providing notification that the road to be traveled is impassable by the vehicle driven by the identified driver.

* * * * *